(12) United States Patent
Mizuma

(10) Patent No.: US 8,614,855 B2
(45) Date of Patent: Dec. 24, 2013

(54) ZOOM LENS

(75) Inventor: Akira Mizuma, Saitama (JP)

(73) Assignee: Tamron Co., Ltd., Saitama-shi (JP)

( * ) Notice: Subject to any disclaimer, the term of this patent is extended or adjusted under 35 U.S.C. 154(b) by 89 days.

(21) Appl. No.: 13/202,041

(22) PCT Filed: Feb. 25, 2010

(86) PCT No.: PCT/JP2010/053006
§ 371 (c)(1),
(2), (4) Date: Aug. 17, 2011

(87) PCT Pub. No.: WO2010/098407
PCT Pub. Date: Sep. 2, 2010

(65) Prior Publication Data
US 2011/0299177 A1    Dec. 8, 2011

(30) Foreign Application Priority Data

Feb. 26, 2009    (JP) .................................. 2009-044473

(51) Int. Cl.
G02B 15/14    (2006.01)
(52) U.S. Cl.
USPC .......................................... 359/684; 359/676
(58) Field of Classification Search
USPC ........................... 359/642, 676, 680–682, 684
See application file for complete search history.

(56) References Cited

U.S. PATENT DOCUMENTS

| | | | |
|---|---|---|---|
| 5,847,882 A | 12/1998 | Nakayama | |
| 6,094,312 A | 7/2000 | Nakayama | |
| 6,483,648 B1 | 11/2002 | Yamanashi | |
| 6,606,200 B1 | 8/2003 | Nakayama et al. | |
| 6,721,105 B2 | 4/2004 | Ohtake et al. | |
| 7,068,429 B1 | 6/2006 | Ori | |
| 7,187,504 B2 | 3/2007 | Horiuchi | |
| 7,336,426 B2 | 2/2008 | Nakatani et al. | |
| 7,446,804 B2 | 11/2008 | Nanjo | |
| 2005/0270646 A1 | 12/2005 | Yamada et al. | |
| 2007/0070521 A1* | 3/2007 | Hayakawa | 359/686 |

(Continued)

FOREIGN PATENT DOCUMENTS

CN    1424613 A    6/2003
CN    1715984 A    1/2006

(Continued)

OTHER PUBLICATIONS

Japanese Office Action and English Language Translation dated Aug. 20, 2013 (5 pages).

Primary Examiner — James Greece
(74) Attorney, Agent, or Firm — Foley & Lardner LLP

(57) ABSTRACT

A zoom lens comprising sequentially from an object side a first lens group having a positive refractive power; a second lens group having a negative refractive power; a third lens group having a positive refractive power; a fourth lens group having a negative refractive power; and a fifth lens group having a positive refractive power and formed by a cemented lens alone that includes a negative lens and a positive lens. The zoom lens zooms from a wide angle edge to a telephoto edge by moving the second lens group along an optical axis, from the object side toward the image plane side. The zoom lens performs focusing and corrects image plane variation accompanying zoom by moving the fourth lens group along the optical axis, and corrects image blur caused by minute vibrations by moving the entire fifth lens group in a direction orthogonal to the optical axis.

8 Claims, 12 Drawing Sheets

(56) References Cited

U.S. PATENT DOCUMENTS

| | | |
|---|---|---|
| 2007/0139788 A1 | 6/2007 | Watanabe |
| 2007/0229966 A1 | 10/2007 | Nakatani et al. |
| 2008/0094709 A1 | 4/2008 | Iwasawa |
| 2009/0324207 A1 | 12/2009 | Hatakeyama et al. |

FOREIGN PATENT DOCUMENTS

| | | |
|---|---|---|
| CN | 1877387 A | 12/2006 |
| JP | 08-005913 A | 1/1996 |
| JP | 08-146295 A | 6/1996 |
| JP | 10-148757 A | 6/1998 |
| JP | 11-084239 A | 3/1999 |
| JP | 2000-180722 A | 6/2000 |
| JP | 2000-298235 A | 10/2000 |
| JP | 2001-033703 A | 2/2001 |
| JP | 2001-228397 A | 8/2001 |
| JP | 2006-071993 A | 3/2006 |
| JP | 2006-195068 A | 7/2006 |
| JP | 2008-234892 A | 9/2006 |
| JP | 2006-276475 A | 10/2006 |
| JP | 2007-171456 A | 7/2007 |
| JP | 2007-264174 A | 10/2007 |

* cited by examiner

ZOOM LENS

TECHNICAL FIELD

The present invention relates to a zoom lens of a compact size and a light weight optimal for mounting to an electronic imaging apparatus such as a monitoring camera, and having function of correcting optical image blur.

BACKGROUND ART

Conventionally, a large number of anti-blur optical systems having a function of preventing the blurring of captured images have been proposed. Among optical systems used for anti-blur, the shifting of a portion of the lenses in the optical lens system, in a direction orthogonal to the optical axis (eccentricity) is the most widely adopted scheme (see, for example, Patent Documents 1 to 3).

For example, the zoom lens recited in Patent Document 1 includes, sequentially from an object side, lens groups that are respectively positive, negative, positive, negative, and positive, where zoom is performed at the second lens group and focusing is performed at the fifth lens group. Further, by moving the entire third lens group in a direction orthogonal to the optical axis, image blur consequent to the occurrence of camera shake is corrected. This zoom lens disposes an anti-blur lens group near the diaphragm and deterioration of optical performance during anti-blur can be suppressed throughout the entire zoom range.

Meanwhile, the zoom lenses recited in Patent Documents 2 and 3 include plural lens groups, where image blur is corrected by shifting the image by moving in a direction orthogonal to the optical axis, a lens in the last lens group positioned farthest on the image side.

[Patent Document 1] Japanese Patent Application Laid-Open Publication No. 2000-298235
[Patent Document 2] Japanese Patent Application Laid-Open Publication No. 2006-71993
[Patent Document 3] Japanese Patent Application Laid-Open Publication No. 2006-276475

DISCLOSURE OF INVENTION

Problem to be Solved by the Invention

However, since monitoring cameras are securely fixed when installed, image blur consequent to handheld-use such as with a video camera is not likely to occur. Nevertheless, recently, even for zoom lenses used in monitoring cameras, a high power zoom lens having a large zoom ratio is desired. Thus, if the zoom ratio is increased, the focal length of the telephoto edge increases, whereby the lens becomes easily affected by minute vibrations (such as that caused by an air conditioner) in the environment where the lens is installed. Consequently, accompanying increased zoom ratios, lenses having an anti-blur function are demanded even for zoom lenses of monitoring cameras.

The zoom lens recited in Patent Document 1 having an F number of 1.65 is bright and having a zoom ratio of 12× is capable of high power zoom. Moreover, having an anti-blur lens group disposed near the diaphragm, the zoom lens is equipped with an anti-blur measure. However, if the diameter and zoom ratio of this zoom lens is to be further increased, the lens diameter of the third group has to be increased. Therefore, accompanying the increased size of the lens, the anti-blur mechanism also increases in size.

In the zoom lenses recited in Patent Documents 2 and 3, if a lens in the last lens group positioned farthest on the image side is given an anti-blur function, the refractive power of the anti-blur lens becomes too strong and the deterioration in optical performance occurring when the optical image blur correction is performed as the anti-blur measure becomes substantial, making diameter increases difficult.

The present invention was conceived in light of the above problems. An object of the present invention is to provide a compact, light weight, high power zoom lens that effectively corrects various types of aberration throughout the entire zoom range and can further perform optical image blur correction as an anti-blur measure.

Means for Solving Problem

To solve the problems above and achieve an object, a zoom lens according to the present invention includes, sequentially from an object side, a first lens group having a positive refractive power, a second lens group having a negative refractive power, a third lens group having a positive refractive power, a fourth lens group having a negative refractive power, and a fifth lens group having a positive refractive power and formed by a cemented lens alone, the cemented lens including a negative lens and a positive lens. The zoom lens zooms from a wide angle edge to a telephoto edge by moving the second lens group along an optical axis, from the object side toward an image plane side. The zoom lens performs focusing and corrects image plane variation accompanying zoom by moving the fourth lens group along the optical axis, and corrects image blur caused by minute vibrations by moving the entire fifth lens group in a direction orthogonal to the optical axis.

According to the present invention, the anti-blur mechanism can be reduced in size by using, as an anti-blur lens group, the entire fifth lens group configured only by the cemented lens.

Further, in the zoom lens according to the invention, the fifth lens group is fixed with respect to a direction along the optical axis during zoom and focusing. According to the invention, the fifth lens group is specialized for an anti-blur function, without being moved in a direction along the optical axis, whereby positioning adjustment of the fifth lens group is easy and the range of movement is limited. Consequently, space saving becomes possible without complicating the anti-blur mechanism. Further, in the zoom lens, the third lens group includes, sequentially from the object side, a positive lens, and a cemented lens formed by a negative lens and a positive lens. According to the invention, in the third lens group, the cemented lens formed by a negative lens and a positive lens is disposed on the image plane side of the positive lens, whereby spherical aberration that cannot be completely corrected by the preceding positive lens can be assuredly reduced by the subsequent cemented lens while chromatic aberration correction can be simultaneously realized. Moreover, in the zoom lens according to the invention, the third lens group includes on the image plane side of the cemented lens, at least 1 positive lens. According to the invention, spherical aberration and chromatic aberration can be favorably corrected by the disposal of at least 1 positive lens on the image plane side of the cemented lens, even with high resolution and a bright state (small F number).

The zoom lens according to the invention further satisfies the following conditional expression, where $f_5$ is the focal length of the fifth lens group and $f_t$ is the focal length of the entire zoom lens system, at the telephoto edge. According to the invention, a proper refractive power of the fifth lens group is facilitated and both favorable correction of various types of aberration and effective correction of image blur can be achieved.

$$0.06 < f_5/f_t < 0.08$$

Further, the zoom lens according to the invention satisfies conditional expressions:

$$|FN_w \times R_p/f_w| > 20,$$

$$FN_w \leq 1.83,$$

$$0.7 < |f_4/f_5| < 1.0$$

Where, $R_p$ is the radius of curvature of the image plane side of the positive lens constituting the fifth lens group, $f_w$ is the focal length of the entire zoom lens system, at the wide angle edge, $FN_w$ is the F number of the entire zoom lens, at the wide angle edge, $f_4$ is the focal length of the fourth lens group, and $f_5$ is the focal length of the fifth lens group.

According to the invention, configuration of the fifth lens group (anti-blur lens group) by the cemented lens alone enables the weight load at the time of anti-blur correction to be suppressed. Further, even in a bright state ($FN_w \leq 1.83$), the deterioration in optical performance occurring when image blur correction is performed can be prevented, making optical system diameter increases easy.

Effect of the Invention

According to the present invention, the provision of a compact, light weight, high power zoom lens that can perform effective correction of various types of aberration throughout the entire zoom range and optical image blur correction as an anti-blur measure, is achieved.

BEST MODE(S) FOR CARRYING OUT THE INVENTION

Figure 1:
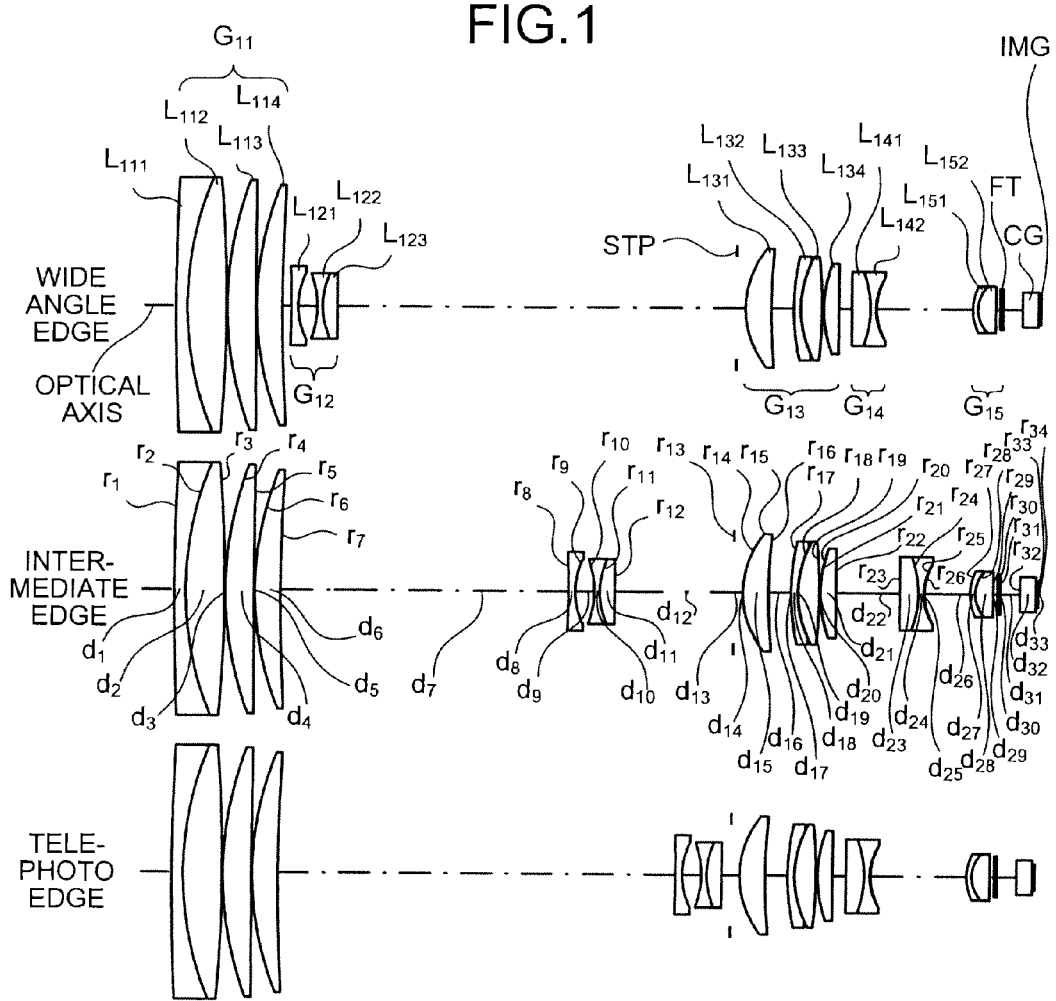
FIG. 1 depicts a cross-sectional view (along the optical axis) of the zoom lens of a first embodiment according to the present invention.

Preferred embodiments of a zoom lens according to the present invention will be described in detail.

The zoom lens according to the present invention includes, sequentially from the object side, a first lens group having a positive refractive power, a second lens group having a negative refractive power, a third lens group having a positive refractive power, a fourth lens group having a negative refractive power, and a fifth lens group having a positive refractive power.

The zoom lens of the present invention zooms from a wide angle edge to a telephoto edge by moving the second lens group along the optical axis from the object side toward the image side. Further, by moving the fourth lens groups along the optical axis, the zoom lens performs focusing and corrects image plane variation (image location), which accompanies zoom. The first lens group and the third lens group do not move.

An object of the present invention is to provide a compact, wide angle zoom lens that is capable of high power zoom of 55× and that maintains high optical performance throughout the entire zoom range while performing optical image blur correction as an anti-blur measure. To achieve this object, various conditions are set as indicated below.

The first lens group includes, sequentially from the object side, a cemented lens that is formed by a negative lens and a positive lens; and 2 positive lenses. The following conditional expression is preferably satisfied, where the Abbe number at the d-line of the negative lens in the cemented lens is $\upsilon_{ln}$ and the Abbe number at the d-line of the positive lens in the cemented lens is $\upsilon_{lp}$.

$$35 < \upsilon_{lp} - \upsilon_{ln} < 44 \qquad (1)$$

Conditional expression (1) is an expression that prescribes a difference of the Abbe numbers at the d-lines of the negative lens and positive lens constituting the cemented lens in the first lens group. Above the upper limit of the conditional expression (1), the correction of axial chromatic aberration along the g-line at the telephoto edge of the zoom lens becomes difficult. On the other hand, below the lower limit of conditional expression (1), the refractive power of each of the lenses has to be increased in order to correct axial chromatic aberration and as a result, a disadvantage arises in that the correction of various types of aberration, including spherical aberration, becomes difficult.

Further, the zoom lens of the present invention preferably satisfies the following conditional expression, where the focal length of the first lens group is $f_1$ and the focal length of the entire zoom lens system, at the telephoto edge is $f_t$.

$$0.27 < f_1/f_t < 0.33 \qquad (2)$$

Condition expression (2) is an expression that prescribes a ratio of the focal length of the first lens group and the focal length of the entire zoom lens system, at the telephoto edge, and represents a condition for achieving a reduction in the overall length of the optical system as well as for facilitating a proper refractive power of the first lens group and for realizing favorable correction of various types of aberration. Below the lower limit of the conditional expression (2), the refractive power of the first lens groups becomes too strong, making the correction of various types of aberration, including spherical aberration at the telephoto edge of the zoom lens, difficult. On the other hand, above the upper limit of conditional expression (2), the refractive power of the first lens group becomes too weak, increasing the overall length of the optical system.

The second lens group includes a cemented lens configured, sequentially from the object side, by a negative lens, a negative lens, and a positive lens. Alternatively, the second lens group includes, sequentially from the object side, a cemented lens configured by a negative lens, a negative lens and a positive lens; and a negative lens. Here, chromatic aberration is favorably corrected by disposing the cemented lens in the second lens group.

The third lens group includes, sequentially from the object side, a positive lens; a cemented lens formed by a negative lens and a positive lens; and a positive lens. On the image plane side of the positive lens, disposal of the cemented lens formed by a negative lens and positive lens enables spherical aberration that cannot be completely corrected by the positive lens to be assuredly reduced by the cemented lens while further enabling chromatic aberration correction to be simultaneously realized. The effect is greater than compared to a configuration where the cemented lens is formed, sequentially from the object side, by a positive and a negative lens. Further, at least 1 positive lens is disposed on the image plane side of the cemented lens, whereby even with high resolution and a bright state (small F number), spherical aberration and chromatic aberration can be favorably corrected. Moreover, at least one surface of the positive lenses configuring the third lens group is formed to be aspheric. By such configuration, various types of aberration, including spherical aberration, can be favorably corrected.

The following conditional expression is preferably satisfied, where the focal length of the third lens group is $f_3$ and the focal length of the entire zoom lens system, at the wide angle edge is $f_w$.

$$3.5 < f_3/f_w < 4.0 \qquad (3)$$

Conditional expression (3) is an expression that prescribes a ratio of the focal length of the third lens group and the focal length of the entire zoom lens system, at the wide angle edge, and represents a condition for achieving a reduction in the overall length of the optical system as well as for facilitating a proper refractive power of the third lens group and for realizing favorable correction of various types of aberration. Below the lower limit of conditional expression (3), the refractive power of the third lens group becomes to strong, making the correction of various types of aberration, including spherical aberration at the wide angle edge, difficult. On the other hand, above the upper limit of conditional expression (3), the refractive power of the third lens group becomes too weak, whereby subsequent lens groups (the third lens group and subsequent lens groups) cannot be made smaller, making it difficult to establish the displacement amount necessary for image plane correction and focusing by the fourth lens group.

The fourth lens group includes, sequentially from the object side, a positive lens and a negative lens. Further, at least 1 surface of the negative lens constituting the fourth lens group is formed to be aspheric. The aspheric surface in the fourth lens group enables favorable correction of various types of aberration by few lenses. In addition, a sufficient displacement amount is established for the fourth lens group and the correction of image plane variation (image location), which accompanies zooming, and focusing can be effectively performed.

The fifth lens group includes, sequentially from the object side, a negative lens and a positive lens that are cemented. Further, by moving the entire fifth lens group in a direction orthogonal to the optical axis, image blur caused by minute vibrations is corrected. In this manner, by using, as an anti-blur lens group, the entire fifth lens group, which is formed by only the cemented lens, reductions in the size and weight of the anti-blur mechanism can be realized. Further, the fifth lens group is fixed with respect to a direction along the optical axis during zoom and focusing, whereby the fifth lens group is specialized for an anti-blur function, without being moved in a direction along the optical axis. Consequently, space saving becomes possible without complicating the anti-blur mechanism.

Furthermore, the zoom lens according to the present invention preferably satisfies the following conditional expression, where the focal length of the fourth lens group is $f_4$ and the focal length of the fifth lens group is $f_5$.

$$0.7 < |f_4/f_5| < 1.0 \qquad (4)$$

Conditional expression (4) is an expression that prescribes a ratio of the focal length of the fourth lens group and the focal length of the fifth lens group. Below the lower limit of conditional expression (4), the refractive power of the fourth lens group becomes too strong, making the correction of various types of aberration, including spherical aberration caused by focal length variation, to become difficult. On the other hand, above the upper limit of conditional expression (4), the refractive power of the fourth lens group becomes too weak, making it difficult to establish the displacement amount necessary for image place correction and focusing by the fourth lens group. Further, if the refractive power of the fifth lens groups becomes strong compared to the fourth lens group, back focus becomes too short, arising in a disadvantage in that it is difficult to establish space for inserting a filter, cover glass and the like.

Further, the zoom lens according to the invention preferably satisfies the following conditional expression, where the focal length of the fifth lens group is $f_5$ and the focal length of the entire zoom lens system, at the telephoto edge is $f_t$.

$$0.06 < f_5/f_t < 0.08 \qquad (5)$$

Conditional expression (5) is an expression that prescribes a ratio of the focal length of the fifth lens group and the focal length of the entire zoom lens system, at the telephoto edge, and represents a condition for facilitating a proper refractive power of the fifth lens group and for achieving both favorable correction of various types of aberration and effective image blur correction. Satisfaction of conditional expression (5) enables an anti-blur function to be provided to the fifth lens group. Below the lower limit of conditional expression (5), the refractive power of the fifth lens group becomes too strong and deterioration in optical performance occurring when the optical image blur correction is performed as the anti-blur measure becomes substantial, making diameter increases difficult. On the other hand, above the upper limit of conditional expression (5), the refractive power of the fifth lens group becomes too weak, whereby a refractive power necessary for image blur correction as an anti-blur measure, cannot be established.

The zoom lens according to the present invention preferably satisfies the following conditional expression, where the radius of curvature on the image plane side of the positive lens constituting the fifth lens group is $R_p$, the focal length of the entire zoom lens system, at the wide angle edge is $f_w$ and the F number of the entire zoom lens system, at the wide angle edge is $FN_w$.

$$|FN_w \times R_p/f_w| > 20 \qquad (6)$$

Conditional expression (6) is an expression that represents a condition for effectively executing image blur correction as an anti-blur measure. Below the lower limit of conditional expression (6), the radius of curvature of the image plane side of the positive lens constituting the fifth lens group becomes too small, increasing the likelihood that blurring will occur when image blur correction is performed as an anti-blur measure.

As described, the zoom lens according to the present invention has the characteristics described above, whereby effective correction of various types of aberration is possible throughout the entire zoom range, without sacrifice of optical system compactness, and high optical performance is maintained while enabling high power zoom. Further, by using the entire fifth lens group as an anti-blur lens group, the anti-blur mechanism can be reduced in size. In addition, by satisfying conditional expressions (5) and (6), effective image blur correction can be performed as an anti-blur measure while maintaining high optical performance. Further, by simultaneously satisfying conditional expressions (4) and (6), configuration of the fifth lens group (anti-blur lens group) by only the cemented lens enables the weight load at the time of anti-blur correction to be suppressed. Further, even in a bright state ($FN_w \leq 1.83$), the deterioration in optical performance occurring when image blur correction is performed can be prevented, making optical system diameter increases easy.

Hereinafter, with reference to the accompanying drawings, embodiments of the zoom lens according to the present invention will be described in detail. However, the present invention is not limited to the embodiments.

First Embodiment

FIG. 1 depicts a cross-sectional view (along the optical axis) of the zoom lens of a first embodiment according to the present invention. The zoom lens includes sequentially from an object (not depicted) side, a first lens group $G_{11}$ having a positive refractive power, a second lens group $G_{12}$ having a negative refractive power, a third lens group $G_{13}$ having a positive refractive power, a fourth lens group $G_{14}$ having a negative refractive power, and a fifth lens group $G_{15}$ having a positive refractive power. Between the second lens group $G_{12}$ and the third lens group $G_{13}$, a diaphragm STP is disposed. Between the fifth lens group $G_{15}$ and an image plane IMG, a filter FT configured by an infrared cut filter, a low pass filter, etc. and a cover glass CG are disposed sequentially from the object side. The filter FT and the cover glass CG are disposed as necessary and when not necessary, may be omitted. Further, at the image plane IMG, the light receiving surface of an imaging element, such as a CCD and CMOS, is disposed.

The first lens group $G_{11}$ includes, sequentially from the object side, a negative lens $L_{111}$, a positive lens $L_{112}$, a positive lens $L_{113}$, and a positive lens $L_{114}$. The negative lens $L_{111}$ and the positive lens $L_{112}$ are cemented.

The second lens group $G_{12}$ includes, sequentially from the object side, a negative lens $L_{121}$, a negative lens $L_{122}$, and a positive lens $L_{123}$. The negative lens $L_{122}$ and the positive lens $L_{123}$ are cemented.

The third lens group $G_{13}$ includes, sequentially from the object side, a positive lens $L_{131}$, a negative lens $L_{132}$, a positive lens $L_{133}$, and a positive lens $L_{134}$. The negative lens $L_{132}$ and the positive lens $L_{133}$ are cemented. Further, the object-side surface of the positive lens $L_{131}$ and that of the positive lens $L_{134}$ are formed to be aspheric, respectively.

The fourth lens group $G_{14}$ includes, sequentially from the object side, a positive lens $L_{141}$ and a negative lens $L_{142}$. The positive lens $L_{141}$ and the negative lens $L_{142}$ are cemented. Further, the image plane IMG-side surface of the negative lens $L_{142}$ is formed to be aspheric.

The fifth lens group $G_{15}$ includes, sequentially from the object side, a negative lens $L_{151}$ and a positive lens $L_{152}$. The negative lens $L_{151}$ and the positive lens $L_{152}$ are cemented.

The zoom lens zooms from the wide angle edge to the telephoto edge by moving the second lens group $G_{12}$ along the optical axis, from the object side toward the image plane IMG side. Further, the zoom lens performs focusing and corrects image plane variation (image location) accompanying zoom, by moving the fourth lens group $G_{14}$ along the optical axis. The zoom lens corrects image blur caused by minute vibrations by moving the entire fifth lens group $G_{15}$ in a direction orthogonal to the optical axis. Furthermore, the first lens group $G_{11}$ and the third lens group $G_{13}$ do not move.

Various values related to the zoom lens according to the first embodiment are indicated below.

Focal length of entire zoom lens system, at wide angle edge ($f_w$) = 6.00 mm
Focal length of entire zoom lens system, at intermediate edge = 45.1 mm
Focal length of entire zoom lens system, at telephoto edge ($f_t$) = 330 mm
F number = 1.82 (wide angle edge) to 2.23 (intermediate edge) to 6.12 (telephoto edge)
Angle of view (2ω) = 62.2° (wide angle edge) to 8.1° (intermediate edge) to 1.1° (telephoto edge)
(Values related to conditional expression (1))

Abbe number at d-line of negative lens $L_{111}$ ($v_{1n}$) = 42.71
Abbe number at d-line of positive lens $L_{112}$ ($v_{1p}$) = 81.54
$v_{1p} - v_{1n}$ = 38.83

-continued (Values related to conditional expression (2))

Focal length of first lens group $G_{11}$ ($f_1$) = 107.82
$f_1/f_t = 0.327$
(Values related to conditional expression (3))

Focal length of third lens group $G_{13}$ ($f_3$) = 23.28
$f_3/f_w = 3.880$
(Values related to conditional expression (4))

Focal length of fourth lens group $G_{14}$ ($f_4$) = −19.25
Focal length of fifth lens group $G_{15}$ ($f_5$) = 23.26
$|f_4/f_5| = 0.828$
(Values related to conditional expression (5))

$f_5/f_t = 0.070$
(Values related to conditional expression (6))

Radius of curvature of image plane IMG side of positive
lens $L_{152}$ ($R_p$) = 1255.491
$|FN_w \times R_p/f_w| = 381.2$

| | | | |
|---|---|---|---|
| $r_1$ = 628.629 | $d_1$ = 2.500 | $nd_1$ = 1.83481 | $vd_1$ = 42.71 |
| $r_2$ = 80.402 | $d_2$ = 8.688 | $nd_2$ = 1.49700 | $vd_2$ = 81.54 |
| $r_3$ = −365.347 | $d_3$ = 0.200 | | |
| $r_4$ = 87.972 | $d_4$ = 6.267 | $nd_3$ = 1.49700 | $vd_3$ = 81.54 |
| $r_5$ = 2937.246 | $d_5$ = 0.200 | | |
| $r_6$ = 79.204 | $d_6$ = 5.610 | $nd_4$ = 1.49700 | $vd_4$ = 81.54 |
| $r_7$ = 449.643 | $d_7$ = 1.970 (wide angle edge) to 63.659 (intermediate edge) to 87.798 (telephoto edge) | | |
| $r_8$ = −339.143 | $d_8$ = 1.500 | $nd_5$ = 1.88300 | $vd_5$ = 40.76 |
| $r_9$ = 18.066 | $d_9$ = 4.200 | | |
| $r_{10}$ = −22.191 | $d_{10}$ = 1.200 | $nd_6$ = 1.77250 | $vd_6$ = 49.60 |
| $r_{11}$ = 18.958 | $d_{11}$ = 3.247 | $nd_7$ = 1.92286 | $vd_7$ = 20.88 |
| $r_{12}$ = 1250.168 | $d_{12}$ = 87.854 (wide angle edge) to 26.166 (intermediate edge) to 2.027 (telephoto edge) | | |
| $r_{13}$ = ∞ (diaphragm) | $d_{13}$ = 1.800 | | |
| $r_{14}$ = 21.761 (aspheric surface) | $d_{14}$ = 0.200 | $nd_8$ = 1.53610 | $vd_8$ = 41.21 |
| $r_{15}$ = 23.133 | $d_{15}$ = 5.580 | $nd_9$ = 1.61800 | $vd_9$ = 63.39 |
| $r_{16}$ = 145.555 | $d_{16}$ = 4.971 | | |
| $r_{17}$ = 58.051 | $d_{17}$ = 1.500 | $nd_{10}$ = 1.92286 | $vd_{10}$ = 20.88 |
| $r_{18}$ = 25.973 | $d_{18}$ = 4.727 | $nd_{11}$ = 1.49700 | $vd_{11}$ = 81.54 |
| $r_{19}$ = −113.813 | $d_{19}$ = 0.200 | | |
| $r_{20}$ = 26.258 (aspheric surface) | $d_{20}$ = 0.200 | $nd_{12}$ = 1.53610 | $vd_{12}$ = 41.21 |
| $r_{21}$ = 31.514 | $d_{21}$ = 3.355 | $nd_{13}$ = 1.61800 | $vd_{13}$ = 63.39 |
| $r_{22}$ = −1442.190 | $d_{22}$ = 2.848 (wide angle edge) to 13.961 (intermediate edge) to 2.900 (telephoto edge) | | |
| $r_{23}$ = −2250.446 | $d_{23}$ = 4.000 | $nd_{14}$ = 1.84666 | $vd_{14}$ = 23.78 |
| $r_{24}$ = −25.866 | $d_{24}$ = 1.200 | $nd_{15}$ = 1.77250 | $vd_{15}$ = 49.60 |
| $r_{25}$ = 14.035 | $d_{25}$ = 0.200 | $nd_{16}$ = 1.53610 | $vd_{16}$ = 41.21 |
| $r_{26}$ = 14.267 (aspheric surface) | $d_{26}$ = 21.119 (wide angle edge) to 10.006 (intermediate edge) to 21.067 (telephoto edge) | | |
| $r_{27}$ = 12.056 | $d_{27}$ = 1.200 | $nd_{17}$ = 1.84666 | $vd_{17}$ = 23.78 |
| $r_{28}$ = 8.142 | $d_{28}$ = 3.879 | $nd_{18}$ = 1.61800 | $vd_{18}$ = 63.39 |
| $r_{29}$ = 1255.491 | $d_{29}$ = 1.000 | | |
| $r_{30}$ = ∞ | $d_{30}$ = 0.500 | $nd_{19}$ = 1.51633 | $vd_{19}$ = 64.14 |
| $r_{31}$ = ∞ | $d_{31}$ = 4.500 | | |
| $r_{32}$ = ∞ | $d_{32}$ = 3.500 | $nd_{20}$ = 1.51633 | $vd_{20}$ = 64.14 |
| $r_{33}$ = ∞ | $d_{33}$ = 0.107 | | |
| $r_{34}$ = ∞ (image plane) | | | |

Constant of cone ($\epsilon$) and Aspheric coefficients (A, B, C, D, E)

(Fourteenth plane)

$\epsilon$ = 1.0000,
A = 0,
B = −5.23637 × $10^{-6}$, C = −1.71971 × $10^{-8}$,
D = 1.07328 × $10^{-11}$, E = −4.88964 × $10^{-14}$ -continued (Twentieth plane)

$\epsilon = 1.0000$,
$A = 0$,
$B = -2.47065 \times 10^{-5}$, $C = -7.71176 \times 10^{-8}$,
$D = 4.08847 \times 10^{-10}$, $E = -2.61922 \times 10^{-12}$
(Twenty-sixth plane)

$\epsilon = 1.0000$,
$A = 0$,
$B = -1.35793 \times 10^{-5}$, $C = -5.61543 \times 10^{-8}$,
$D = -8.21418 \times 10^{-9}$, $E = 1.56660 \times 10^{-10}$ Among the values for each of the examples above, $r_1$, $r_2$, . . . indicate radii of curvature for each lens, diaphragm surface, etc.; $d_1$, $d_2$, . . . indicate the thickness of the lenses, diaphragm, etc. or the distance between surfaces thereof; $nd_1$, $nd_2$, . . . indicate the refraction index of each lens with respect to the d-line ($\lambda$=587.56 nm); and $\upsilon d_1$, $\upsilon d_2$, . . . indicate the Abbe number with respect to the d-line ($\lambda$=587.56 nm) of each lens.

Each of the aspheric surfaces above can be expressed by equation [1], where X is the direction of the optical axis, H is the height from the optical axis, and the travel direction of light is positive.

$$X = \frac{H^2/R}{1+\sqrt{1-(\varepsilon H^2/R^2)}} + AH^2 + BH^4 + CH^6 + DH^8 + EH^{10} \quad [1]$$

Where, R is the paraxial radius of curvature; $\epsilon$ is the constant of the cone; and A, B, C, D, E are the second, fourth, sixth, eighth, and tenth aspheric coefficients, respectively.

Figure 2:
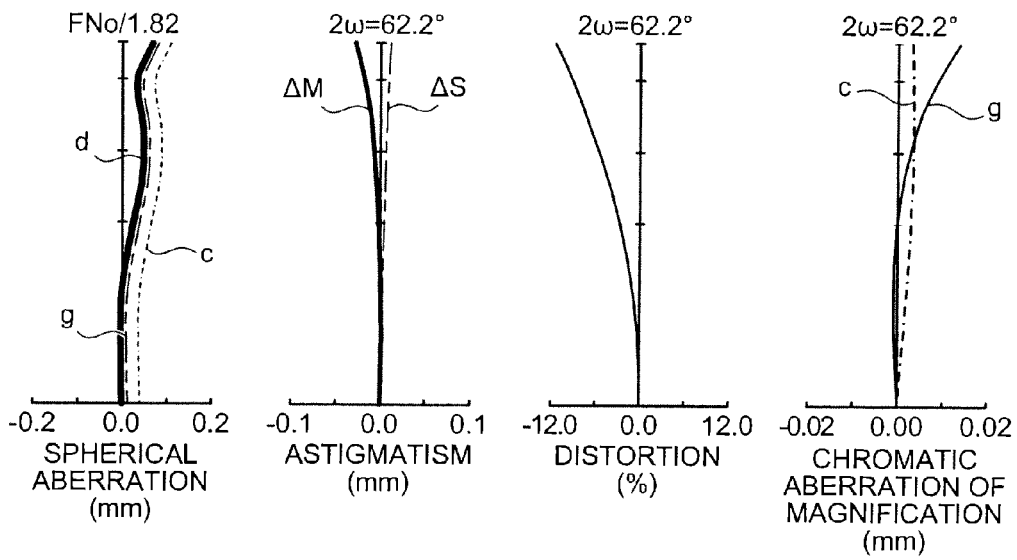
FIG. 2 is a diagram of various types of aberration at the wide angle edge of the zoom lens of the first embodiment according to the invention.
Figure 3:
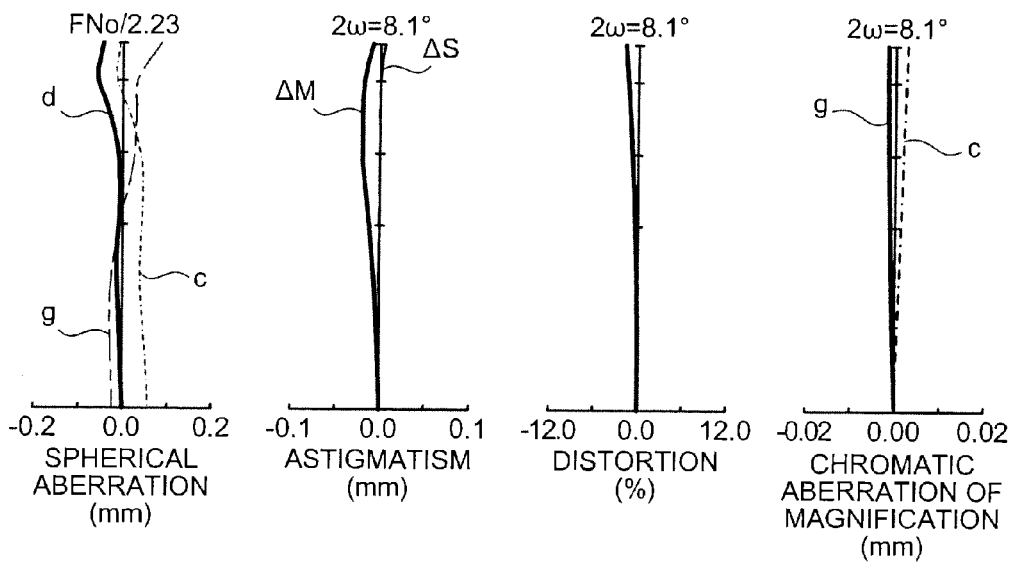
FIG. 3 is a diagram of various types of aberration at the intermediate edge of the zoom lens of the first embodiment according to the invention.
Figure 4:
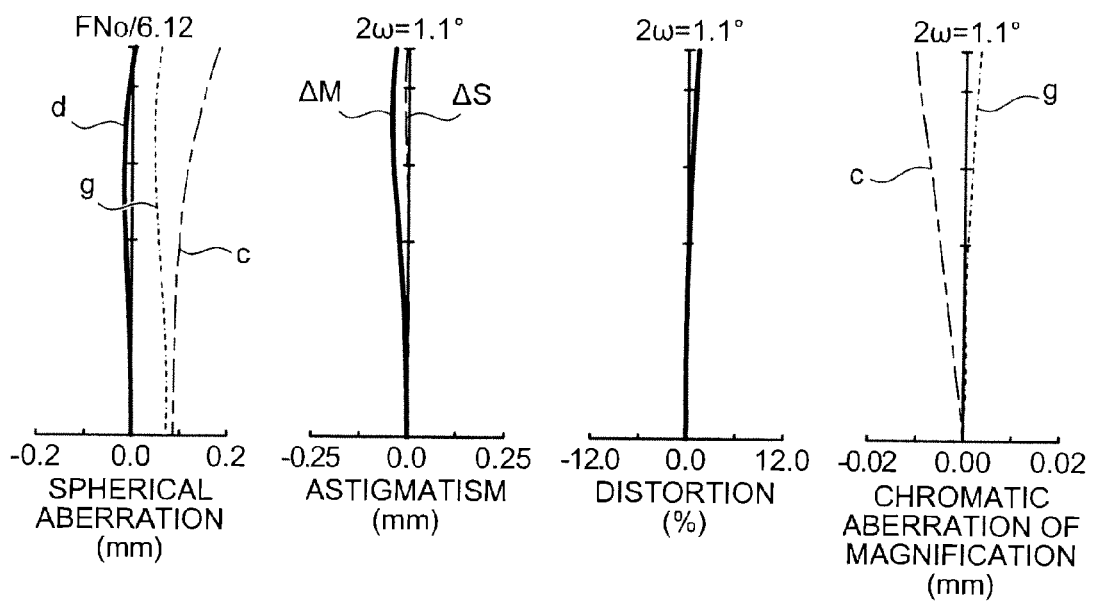
FIG. 4 is a diagram of various types of aberration at the telephoto edge of the zoom lens of the first embodiment according to the invention.

FIG. 2 is a diagram of various types of aberration at the wide angle edge of the zoom lens of the first embodiment according to the invention; FIG. 3 is a diagram of various types of aberration at the intermediate edge of the zoom lens of the first embodiment according to the invention; and FIG. 4 is a diagram of various types of aberration at the telephoto edge of the zoom lens of the first embodiment according to the invention. In the diagrams, FNo indicates the F number and 2$\omega$ indicates the angle of view. Furthermore, g, d, and c represent wavelength aberration corresponding to the g-line ($\lambda$=435.83 nm), the d-line ($\lambda$=587.56 nm), and the c-line ($\lambda$=656.27 nm), respectively; and $\Delta$S and $\Delta$M in a portion depicting astigmatism, indicate aberration with respect to a sagittal image plane and a meridional image plane, respectively.

As described, according to the zoom lens of the first embodiment, by satisfying the conditional expressions above, favorable aberration correction throughout the entire zoom range as well as compactness, high power zoom (on the order of 55×), and wide angle view (approximately 60°) can be achieved. In addition, optical image blur correction can be effectively performed as an anti-blur measure. Moreover, the zoom lens of the first embodiment has a configuration that includes a lens having an aspheric surface, whereby various types of aberration can be favorably corrected with few lenses.

Second Embodiment

Figure 5:
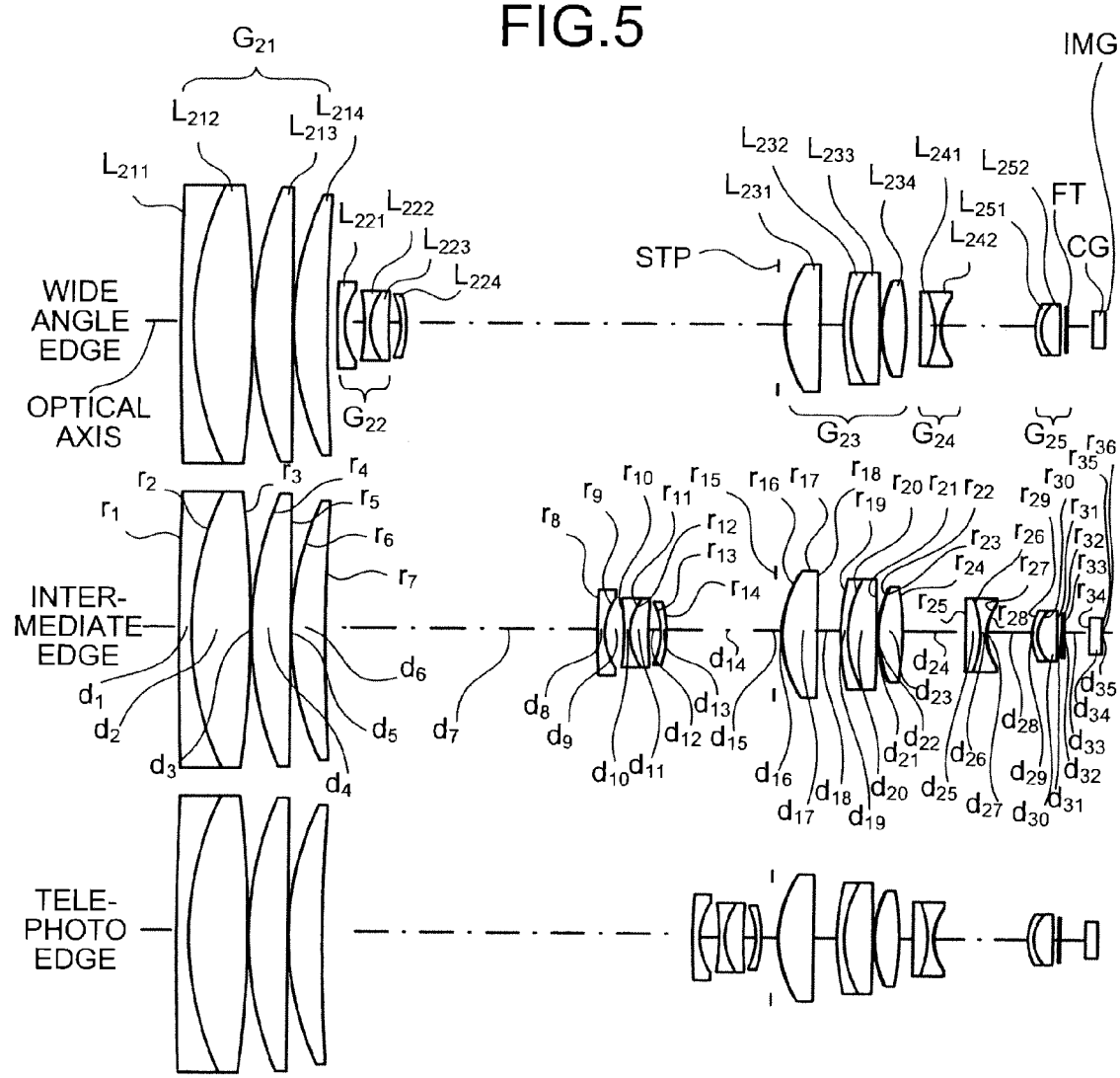
FIG. 5 depicts a cross-sectional view (along the optical axis) of the zoom lens of a second embodiment according to the present invention.

FIG. 5 depicts a cross-sectional view (along the optical axis) of the zoom lens of a second embodiment according to the present invention. The zoom lens includes sequentially from an object (not depicted) side, a first lens group $G_{21}$ having a positive refractive power, a second lens group $G_{22}$ having a negative refractive power, a third lens group $G_{23}$ having a positive refractive power, a fourth lens group $G_{24}$ having a negative refractive power, and a fifth lens group $G_{25}$ having a positive refractive power. Between the second lens group $G_{22}$ and the third lens group $G_{23}$, the diaphragm STP is disposed. Between the fifth lens group $G_{25}$ and the image plane IMG, the filter FT configured by an infrared cut filter, a low pass filter, etc. and the cover glass CG are disposed sequentially from the object side. The filter FT and the cover glass CG are disposed as necessary and when not necessary, may be omitted. Further, at the image plane IMG, the light receiving surface of an imaging element, such as a CCD and CMOS, is disposed.

The first lens group $G_{21}$ includes, sequentially from the object side, a negative lens $L_{211}$, a positive lens $L_{212}$, a positive lens $L_{213}$, and a positive lens $L_{214}$. The negative lens $L_{211}$ and the positive lens $L_{212}$ are cemented.

The second lens group $G_{22}$ includes, sequentially from the object side, a negative lens $L_{221}$, a negative lens $L_{222}$, a positive lens $L_{223}$, and a negative lens $L_{224}$. The negative lens $L_{222}$ and the positive lens $L_{223}$ are cemented.

The third lens group $G_{23}$ includes, sequentially from the object side, a positive lens $L_{231}$, a negative lens $L_{232}$, a positive lens $L_{233}$, and a positive lens $L_{234}$. The negative lens $L_{232}$ and the positive lens $L_{233}$ are cemented. Further, the object-side surface of the positive lens $L_{231}$ and that of the positive lens $L_{234}$ are formed to be aspheric, respectively.

The fourth lens group $G_{24}$ includes, sequentially from the object side, a positive lens $L_{241}$ and a negative lens $L_{242}$. The positive lens $L_{241}$ and the negative lens $L_{242}$ are cemented. Further, the image plane IMG-side surface of the negative lens $L_{242}$ is formed to be aspheric.

The fifth lens group $G_{25}$ includes, sequentially from the object side, a negative lens $L_{251}$ and a positive lens $L_{252}$. The negative lens $L_{251}$ and the positive lens $L_{252}$ are cemented.

The zoom lens zooms from the wide angle edge to the telephoto edge by moving the second lens group $G_{22}$ along the optical axis, from the object side toward the image plane IMG side. Further, the zoom lens performs focusing and corrects image plane variation (image location) accompanying zoom, by moving the fourth lens group $G_{24}$ along the optical axis. The zoom lens corrects image blur caused by minute vibrations by moving the entire fifth lens group $G_{25}$ in a direction orthogonal to the optical axis. Furthermore, the first lens group $G_{21}$ and the third lens group $G_{23}$ do not move.

Various values related to the zoom lens according to the second embodiment are indicated below.

Focal length of entire zoom lens system, at wide angle edge
($f_w$) = 6.00 mm
Focal length of entire zoom lens system, at intermediate
edge = 44.1 mm
Focal length of entire zoom lens system, at telephoto edge
($f_t$) = 330 mm
F number = 1.82 (wide angle edge) to 2.25 (intermediate edge)
to 6.10 (telephoto edge)
Angle of view (2ω) = 60.0° (wide angle edge) to 8.3°
(intermediate edge) to 1.1° (telephoto edge)
(Values related to conditional expression (1))

Abbe number at d-line of negative lens $L_{211}$ ($υ_{ln}$) = 42.71
Abbe number at d-line of positive lens $L_{212}$ ($υ_{lp}$) = 81.54
$υ_{lp} - υ_{ln}$ = 38.83
(Values related to conditional expression (2))

Focal length of first lens group $G_{21}$ ($f_1$) = 95.50
$f_1/f_t$ = 0.289
(Values related to conditional expression (3))

Focal length of third lens group $G_{23}$ ($f_3$) = 22.50
$f_3/f_w$ = 3.750
(Values related to conditional expression (4))

Focal length of fourth lens group $G_{24}$ ($f_4$) = −15.72
Focal length of fifth lens group $G_{25}$ ($f_5$) = 20.94
$|f_4/f_5|$ = 0.750
(Values related to conditional expression (5))

$f_5/f_t$ = 0.063
(Values related to conditional expression (6))

Radius of curvature of image plane IMG side of positive
lens $L_{252}$ ($R_p$) = −134.663
$|FN_w \times R_p/f_w|$ = 40.9

| | | | |
|---|---|---|---|
| $r_1$ = 873.775 | $d_1$ = 2.500 | $nd_1$ = 1.83481 | $υd_1$ = 42.71 |
| $r_2$ = 73.535 | $d_2$ = 12.200 | $nd_2$ = 1.49700 | $υd_2$ = 81.54 |
| $r_3$ = −257.818 | $d_3$ = 0.200 | | |
| $r_4$ = 81.531 | $d_4$ = 8.000 | $nd_3$ = 1.49700 | $υd_3$ = 81.54 |
| $r_5$ = 6696.081 | $d_5$ = 0.200 | | |
| $r_6$ = 71.004 | $d_6$ = 6.800 | $nd_4$ = 1.49700 | $υd_4$ = 81.54 |
| $r_7$ = 431.378 | $d_7$ = 1.987 (wide angle edge) to 55.951 (intermediate edge) to 76.261 (telephoto edge) | | |
| $r_8$ = 157.153 | $d_8$ = 1.500 | $nd_5$ = 1.88300 | $υd_5$ = 40.76 |
| $r_9$ = 14.203 | $d_9$ = 4.000 | | |
| $r_{10}$ = −50.906 | $d_{10}$ = 1.200 | $nd_6$ = 1.77250 | $υd_6$ = 49.60 |
| $r_{11}$ = 13.178 | $d_{11}$ = 3.800 | $nd_7$ = 1.92286 | $υd_7$ = 20.88 |
| $r_{12}$ = 99.974 | $d_{12}$ = 2.500 | | |
| $r_{13}$ = −16.428 | $d_{13}$ = 1.200 | $nd_8$ = 1.80610 | $υd_8$ = 33.27 |
| $r_{14}$ = −25.765 | $d_{14}$ = 76.316 (wide angle edge) to 22.351 (intermediate edge) to 2.042 (telephoto edge) | | |
| $r_{15}$ = ∞ (diaphragm) | $d_{15}$ = 1.300 | | |
| $r_{16}$ = 24.505 (aspheric surface) | $d_{16}$ = 0.200 | $nd_9$ = 1.53610 | $υd_9$ = 41.21 |
| $r_{17}$ = 26.591 | $d_{17}$ = 7.200 | $nd_{10}$ = 1.61800 | $υd_{10}$ = 63.39 |
| $r_{18}$ = −1147.714 | $d_{18}$ = 4.726 | | |
| $r_{19}$ = 53.199 | $d_{19}$ = 1.500 | $nd_{11}$ = 1.92286 | $υd_{11}$ = 20.88 |
| $r_{20}$ = 25.167 | $d_{20}$ = 6.000 | $nd_{12}$ = 1.49700 | $υd_{12}$ = 81.54 |
| $r_{21}$ = −349.403 | $d_{21}$ = 0.200 | | |
| $r_{22}$ = 22.951 (aspheric surface) | $d_{22}$ = 0.200 | $nd_{13}$ = 1.53610 | $υd_{13}$ = 41.21 |
| $r_{23}$ = 24.974 | $d_{23}$ = 5.000 | $nd_{14}$ = 1.48749 | $υd_{14}$ = 70.24 |
| $r_{24}$ = −60.637 | $d_{24}$ = 2.899 (wide angle edge) to 12.912 (intermediate edge) to 2.861 (telephoto edge) | | |
| $r_{25}$ = −753.567 | $d_{25}$ = 3.000 | $nd_{15}$ = 1.84666 | $υd_{15}$ = 23.78 |
| $r_{26}$ = −22.060 | $d_{26}$ = 1.200 | $nd_{16}$ = 1.77250 | $υd_{16}$ = 49.60 |
| $r_{27}$ = 11.766 | $d_{27}$ = 0.200 | $nd_{17}$ = 1.53610 | $υd_{17}$ = 41.21 |
| $r_{28}$ = 11.741 (aspheric surface) | $d_{28}$ = 19.259 (wide angle edge) to 9.245 (intermediate edge) to 19.296 (telephoto edge) | | |
| $r_{29}$ = 11.907 | $d_{29}$ = 1.200 | $nd_{18}$ = 1.84666 | $υd_{18}$ = 23.78 |
| $r_{30}$ = 8.010 | $d_{30}$ = 4.000 | $nd_{19}$ = 1.61800 | $υd_{19}$ = 63.39 |
| $r_{31}$ = −134.663 | $d_{31}$ = 1.000 | | |
| $r_{32}$ = ∞ | $d_{32}$ = 0.500 | $nd_{20}$ = 1.51633 | $υd_{20}$ = 64.14 |
| $r_{33}$ = ∞ | $d_{33}$ = 5.200 | | |

-continued $r_{34} = \infty$  $d_{34} = 2.500$  $nd_{21} = 1.51633$  $\upsilon d_{21} = 64.14$
$r_{35} = \infty$  $d_{35} = 0.110$
$r_{36} = \infty$ (image plane)

Constant of cone ($\epsilon$) and Aspheric coefficients (A, B, C, D, E)

(Sixteenth plane)

$\epsilon = 1.0000$,
A = 0,
B = $-6.35402 \times 10^{-6}$, C = $-2.24383 \times 10^{-8}$,
D = $3.62247 \times 10^{-11}$, E = $-8.77579 \times 10^{-14}$
(Twenty-second plane)

$\epsilon = 1.0000$,
A = 0,
B = $-2.75341 \times 10^{-5}$, C = $-3.18129 \times 10^{-8}$,
D = $8.54201 \times 10^{-11}$, E = $-5.66320 \times 10^{-13}$
(Twenty-eighth plane)

$\epsilon = 1.0000$,
A = 0,
B = $-2.18710 \times 10^{-5}$, C = $-9.28709 \times 10^{-7}$,
D = $1.71800 \times 10^{-8}$, E = $-1.23004 \times 10^{-10}$ Among the values for each of the examples above, $r_1$, $r_2$, . . . indicate radii of curvature for each lens, diaphragm surface, etc.; $d_1$, $d_2$, . . . indicate the thickness of the lenses, diaphragm, etc. or the distance between surfaces thereof; $nd_1$, $nd_2$, . . . indicate the refraction index of each lens with respect to the d-line ($\lambda$=587.56 nm); and $\upsilon d_1$, $\upsilon d_2$, . . . indicate the Abbe number with respect to the d-line ($\lambda$=587.56 nm) of each lens.

Each of the aspheric surfaces above can be expressed by equation [1], where X is the direction of the optical axis, H is the height from the optical axis, and the travel direction of light is positive.

Where, R is the paraxial radius of curvature; $\epsilon$ is the constant of the cone; and A, B, C, D, E are the second, fourth, sixth, eighth, and tenth aspheric coefficients, respectively.

Figure 6:
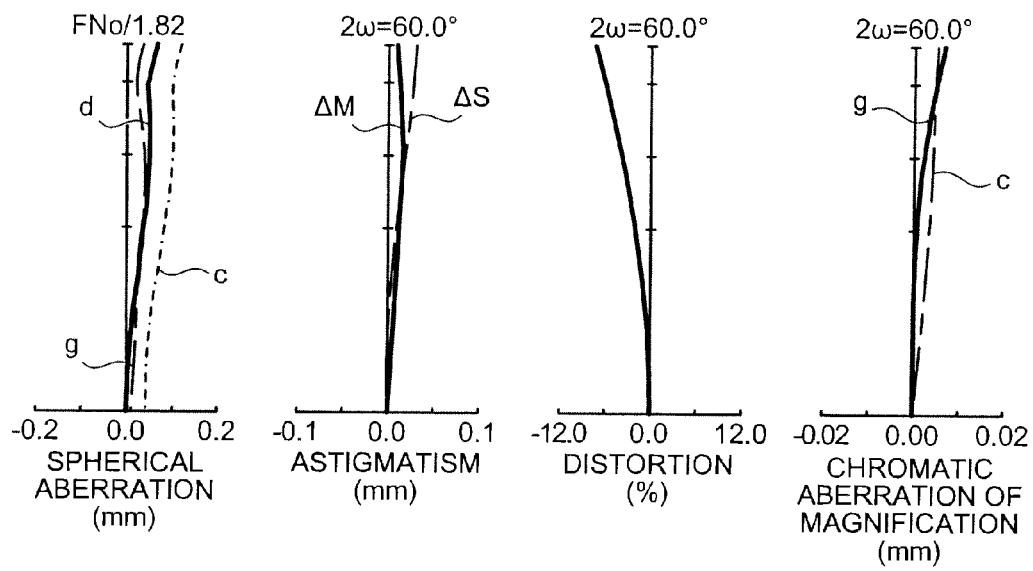
FIG. 6 is a diagram of various types of aberration at the wide angle edge of the zoom lens of the second embodiment according to the invention.
Figure 7:
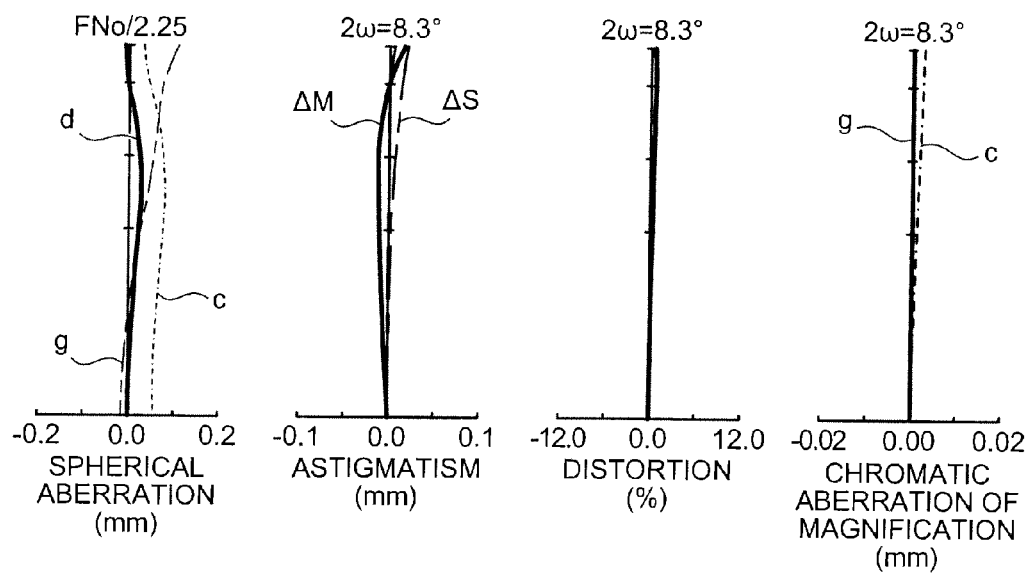
FIG. 7 is a diagram of various types of aberration at the intermediate edge of the zoom lens of the second embodiment according to the invention.
Figure 8:
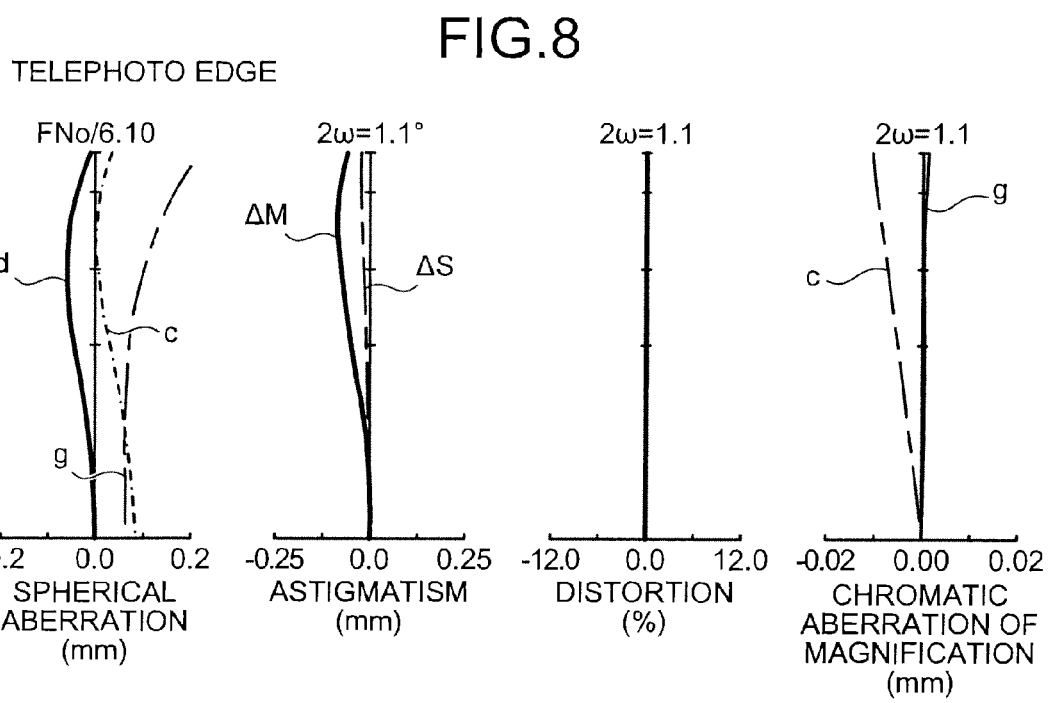
FIG. 8 is a diagram of various types of aberration at the telephoto edge of the zoom lens of the second embodiment according to the invention.

FIG. 6 is a diagram of various types of aberration at the wide angle edge of the zoom lens of the second embodiment according to the invention; FIG. 7 is a diagram of various types of aberration at the intermediate edge of the zoom lens of the second embodiment according to the invention; and FIG. 8 is a diagram of various types of aberration at the telephoto edge of the zoom lens of the second embodiment according to the invention. In the diagrams, FNo indicates the F number and 2$\omega$ indicates the angle of view. Furthermore, g, d, and c represent wavelength aberration corresponding to the g-line ($\lambda$=435.83 nm), the d-line ($\lambda$=587.56 nm), and the c-line ($\lambda$=656.27 nm), respectively; and $\Delta$S and $\Delta$M in a portion depicting astigmatism, indicate aberration with respect to a sagittal image plane and a meridional image plane, respectively.

As described, according to the zoom lens of the second embodiment, by satisfying the conditional expressions above, favorable aberration correction throughout the entire zoom range as well as compactness, high power zoom (on the order of 55x), and wide angle view (approximately 60°) can be achieved. In addition, optical image blur correction can be effectively performed as an anti-blur measure. Moreover, the zoom lens of the second embodiment has a configuration that includes a lens having an aspheric surface, whereby various types of aberration can be favorably corrected with few lenses.

Third Embodiment

Figure 9:
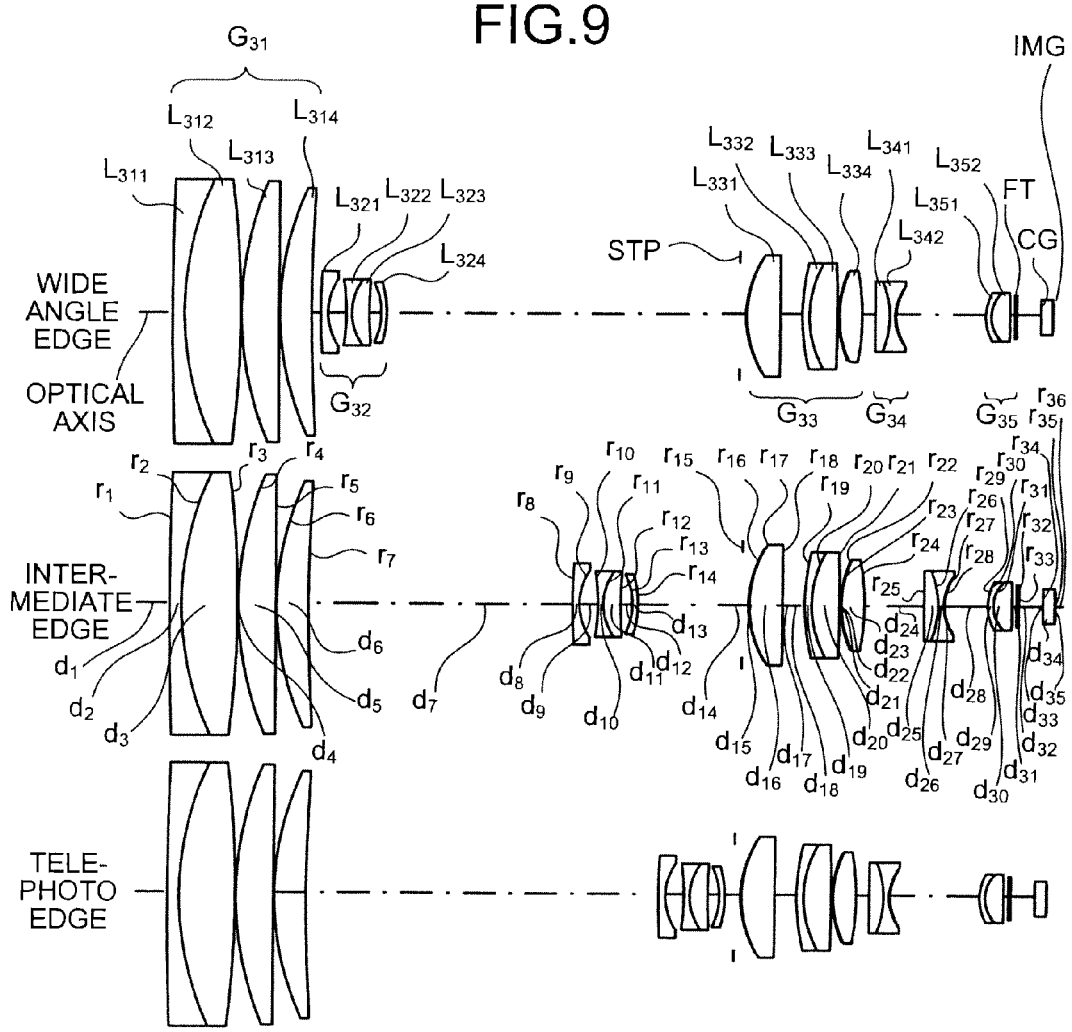
FIG. 9 depicts a cross-sectional view (along the optical axis) of the zoom lens of a third embodiment according to the present invention.

FIG. 9 depicts a cross-sectional view (along the optical axis) of the zoom lens of a third embodiment according to the present invention. The zoom lens includes sequentially from an object (not depicted) side, a first lens group $G_{31}$ having a positive refractive power, a second lens group $G_{32}$ having a negative refractive power, a third lens group $G_{33}$ having a positive refractive power, a fourth lens group $G_{34}$ having a negative refractive power, and a fifth lens group $G_{35}$ having a positive refractive power. Between the second lens group $G_{32}$ and the third lens group $G_{33}$, the diaphragm STP is disposed. Between the fifth lens group $G_{35}$ and the image plane IMG, the filter FT configured by an infrared cut filter, a low pass filter, etc. and the cover glass CG are disposed sequentially from the object side. The filter FT and the cover glass CG are disposed as necessary and when not necessary, may be omitted. Further, at the image plane IMG, the light receiving surface of an imaging element, such as a CCD and CMOS, is disposed.

The first lens group $G_{31}$ includes, sequentially from the object side, a negative lens $L_{311}$, a positive lens $L_{312}$, a positive lens $L_{313}$, and a positive lens $L_{314}$. The negative lens $L_{311}$ and the positive lens $L_{312}$ are cemented.

The second lens group $G_{32}$ includes, sequentially from the object side, a negative lens $L_{321}$, a negative lens $L_{322}$, a positive lens $L_{323}$, and a negative lens $L_{324}$. The negative lens $L_{322}$ and the positive lens $L_{323}$ are cemented.

The third lens group $G_{33}$ includes, sequentially from the object side, a positive lens $L_{331}$, a negative lens $L_{332}$, a positive lens $L_{333}$, and a positive lens $L_{334}$. The negative lens $L_{332}$ and the positive lens $L_{333}$ are cemented. Further, the object-side surface of the positive lens $L_{331}$ and that of the positive lens $L_{334}$ are formed to be aspheric, respectively.

The fourth lens group $G_{34}$ includes, sequentially from the object side, a positive lens $L_{341}$ and a negative lens $L_{342}$. The positive lens $L_{341}$ and the negative lens $L_{342}$ are cemented. Further, the image plane IMG-side surface of the negative lens $L_{342}$ is formed to be aspheric.

The fifth lens group $G_{35}$ includes, sequentially from the object side, a negative lens $L_{351}$ and a positive lens $L_{352}$. The negative lens $L_{351}$ and the positive lens $L_{352}$ are cemented.

The zoom lens zooms from the wide angle edge to the telephoto edge by moving the second lens group $G_{32}$ along the optical axis, from the object side toward the image plane IMG side. Further, the zoom lens performs focusing and corrects image plane variation (image location) accompanying zoom, by moving the fourth lens group $G_{34}$ along the optical axis. The zoom lens corrects image blur caused by minute vibrations by moving the entire fifth lens group $G_{35}$ in a direction orthogonal to the optical axis. Furthermore, the first lens group $G_{31}$ and the third lens group $G_{33}$ do not move.

Various values related to the zoom lens according to the third embodiment are indicated below.

---

Focal length of entire zoom lens system, at wide angle edge
($f_w$) = 6.00 mm
Focal length of entire zoom lens system, at intermediate
edge = 44.4 mm
Focal length of entire zoom lens system, at telephoto edge
($f_t$) = 330 mm
F number = 1.82 (wide angle edge) to 2.24 (intermediate edge)
to 6.12 (telephoto edge)
Angle of view (2ω) = 61.1° (wide angle edge) to 8.3°
(intermediate edge) to 1.1° (telephoto edge)
(Values related to conditional expression (1))

Abbe number at d-line of negative lens $L_{311}$ ($v_{ln}$) = 42.71
Abbe number at d-line of positive lens $L_{312}$ ($v_{lp}$) = 81.54
$v_{lp} - v_{ln}$ = 38.83
(Values related to conditional expression (2))

Focal length of first lens group $G_{31}$ ($f_1$) = 95.28
$f_1/f_t$ = 0.289
(Values related to conditional expression (3))

Focal length of third lens group $G_{33}$ ($f_3$) = 22.37
$f_3/f_w$ = 3.729
(Values related to conditional expression (4))

Focal length of fourth lens group $G_{34}$ ($f_4$) = −16.09
Focal length of fifth lens group $G_{35}$ ($f_5$) = 21.36
$|f_4/f_5|$ = 0.753
(Values related to conditional expression (5))

$f_5/f_t$ = 0.065
(Values related to conditional expression (6))

Radius of curvature on image plane IMG side of positive
lens $L_{352}$ ($R_p$) = −311.620
$|FN_w \times R_p/f_w|$ = 94.7

---

| | | | |
|---|---|---|---|
| $r_1$ = 796.673 | $d_1$ = 2.500 | $nd_1$ = 1.83481 | $vd_1$ = 42.71 |
| $r_2$ = 73.778 | $d_2$ = 10.174 | $nd_2$ = 1.49700 | $vd_2$ = 81.54 |
| $r_3$ = −263.780 | $d_3$ = 0.200 | | |
| $r_4$ = 80.175 | $d_4$ = 7.181 | $nd_3$ = 1.49700 | $vd_3$ = 81.54 |
| $r_5$ = 4029.349 | $d_5$ = 0.200 | | |
| $r_6$ = 70.278 | $d_6$ = 6.308 | $nd_4$ = 1.49700 | $vd_4$ = 81.54 |
| $r_7$ = 396.810 | $d_7$ = 1.962 (wide angle edge) to 55.974 (intermediate edge) to 76.302 (telephoto edge) | | |
| $r_8$ = −598.754 | $d_8$ = 1.500 | $nd_5$ = 1.88300 | $vd_5$ = 40.76 |
| $r_9$ = 15.686 | $d_9$ = 4.000 | | |
| $r_{10}$ = −43.914 | $d_{10}$ = 1.200 | $nd_6$ = 1.77250 | $vd_6$ = 49.60 |
| $r_{11}$ = 14.136 | $d_{11}$ = 3.500 | $nd_7$ = 1.92286 | $vd_7$ = 20.88 |
| $r_{12}$ = 116.272 | $d_{12}$ = 2.035 | | |
| $r_{13}$ = −21.060 | $d_{13}$ = 1.200 | $nd_8$ = 1.83400 | $vd_8$ = 37.16 |
| $r_{14}$ = −33.746 | $d_{14}$ = 76.372 (wide angle edge) to 22.360 (intermediate edge) to 2.033 (telephoto edge) | | |
| $r_{15}$ = ∞ (diaphragm) | $d_{15}$ = 1.300 | | |
| $r_{16}$ = 23.367 (aspheric surface) | $d_{16}$ = 0.200 | $nd_9$ = 1.53610 | $vd_9$ = 41.21 |
| $r_{17}$ = 25.239 | $d_{17}$ = 5.971 | $nd_{10}$ = 1.61800 | $vd_{10}$ = 63.39 |
| $r_{18}$ = 34290.588 | $d_{18}$ = 6.144 | | |
| $r_{19}$ = 83.169 | $d_{19}$ = 1.500 | $nd_{11}$ = 1.92286 | $vd_{11}$ = 20.88 |
| $r_{20}$ = 30.105 | $d_{20}$ = 4.527 | $nd_{12}$ = 1.49700 | $vd_{12}$ = 81.54 |
| $r_{21}$ = −104.257 | $d_{21}$ = 0.200 | | |
| $r_{22}$ = 21.542 (aspheric surface) | $d_{22}$ = 0.200 | $nd_{13}$ = 1.53610 | $vd_{13}$ = 41.21 |
| $r_{23}$ = 24.092 | $d_{23}$ = 4.787 | $nd_{14}$ = 1.48749 | $vd_{14}$ = 70.24 |
| $r_{24}$ = −84.407 | $d_{24}$ = 2.809 (wide angle edge) to 12.915 (intermediate edge) to 2.856 (telephoto edge) | | |
| $r_{25}$ = −1485.826 | $d_{25}$ = 2.957 | $nd_{15}$ = 1.84666 | $vd_{15}$ = 23.78 |
| $r_{26}$ = −24.241 | $d_{26}$ = 1.200 | $nd_{16}$ = 1.77250 | $vd_{16}$ = 49.60 |
| $r_{27}$ = 12.870 | $d_{27}$ = 0.200 | $nd_{17}$ = 1.53610 | $vd_{17}$ = 41.21 |
| $r_{28}$ = 11.594 (aspheric surface) | $d_{28}$ = 20.044 (wide angle edge) to 9.939 (intermediate edge) to 19.998 (telephoto edge) | | |
| $r_{29}$ = 11.743 | $d_{29}$ = 1.200 | $nd_{18}$ = 1.84666 | $vd_{18}$ = 23.78 |
| $r_{30}$ = 8.088 | $d_{30}$ = 4.000 | $nd_{19}$ = 1.61800 | $vd_{19}$ = 63.39 |

-continued

| | | | |
|---|---|---|---|
| $r_{31} = -311.620$ | $d_{31} = 1.000$ | | |
| $r_{32} = \infty$ | $d_{32} = 0.500$ | $nd_{20} = 1.51633$ | $\upsilon d_{20} = 64.14$ |
| $r_{33} = \infty$ | $d_{33} = 4.500$ | | |
| $r_{34} = \infty$ | $d_{34} = 3.500$ | $nd_{21} = 1.51633$ | $\upsilon d_{21} = 64.14$ |
| $r_{35} = \infty$ | $d_{35} = 0.050$ | | |
| $r_{36} = \infty$ (image plane) | | | |

Constant of cone ($\epsilon$) and Aspheric coefficients (A, B, C, D, E)

(Sixteenth plane)

$\epsilon = 1.0000$,
$A = 0$,
$B = -6.62093 \times 10^{-6}$, $C = -1.87750 \times 10^{-8}$,
$D = 3.39027 \times 10^{-12}$, $E = -1.87213 \times 10^{-14}$ (Twenty-second plane)

$\epsilon = 1.0000$,
$A = 0$,
$B = -2.69258 \times 10^{-5}$, $C = -9.28801 \times 10^{-8}$,
$D = 6.67082 \times 10^{-10}$, $E = -3.35828 \times 10^{-12}$ (Twenty-eighth plane)

$\epsilon = 1.0000$,
$A = 0$,
$B = -2.43565 \times 10^{-5}$, $C = -6.79526 \times 10^{-7}$,
$D = 1.55754 \times 10^{-9}$, $E = 1.29309 \times 10^{-10}$ Among the values for each of the examples above, $r_1$, $r_2$, . . . indicate radii of curvature for each lens, diaphragm surface, etc.; $d_1$, $d_2$, . . . indicate the thickness of the lenses, diaphragm, etc. or the distance between surfaces thereof; $nd_1$, $nd_2$, . . . indicate the refraction index of each lens with respect to the d-line ($\lambda=587.56$ nm); and $\upsilon d_1$, $\upsilon d_2$, . . . indicate the Abbe number with respect to the d-line ($\lambda=587.56$ nm) of each lens.

Each of the aspheric surfaces above can be expressed by equation [1], where X is the direction of the optical axis, H is the height from the optical axis, and the travel direction of light is positive.

Where, R is the paraxial radius of curvature; $\epsilon$ is the constant of the cone; and A, B, C, D, E are the second, fourth, sixth, eighth, and tenth aspheric coefficients, respectively.

Figure 10:
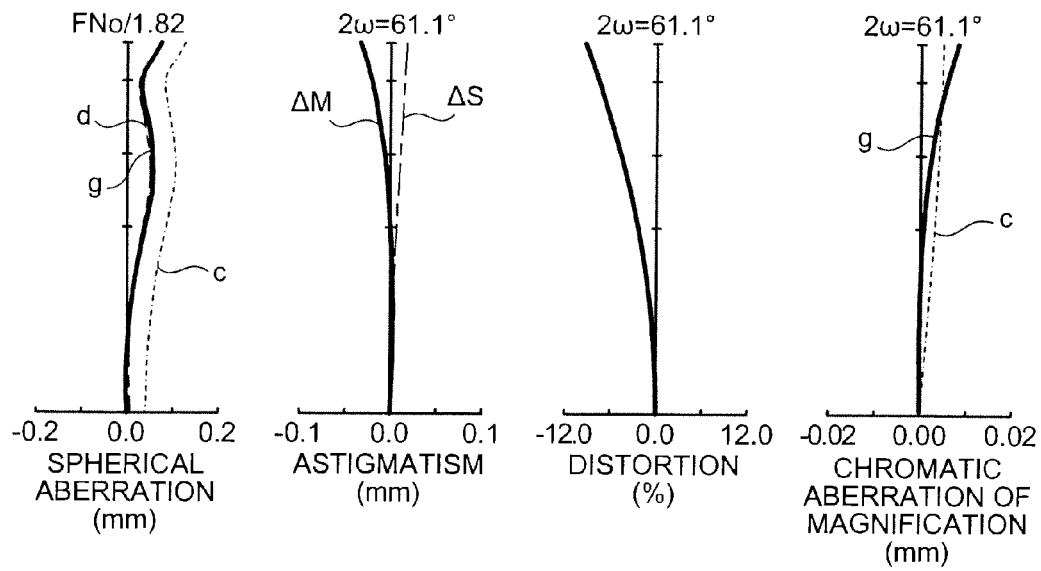
FIG. 10 is a diagram of various types of aberration at the wide angle edge of the zoom lens of the third embodiment according to the invention.
Figure 11:
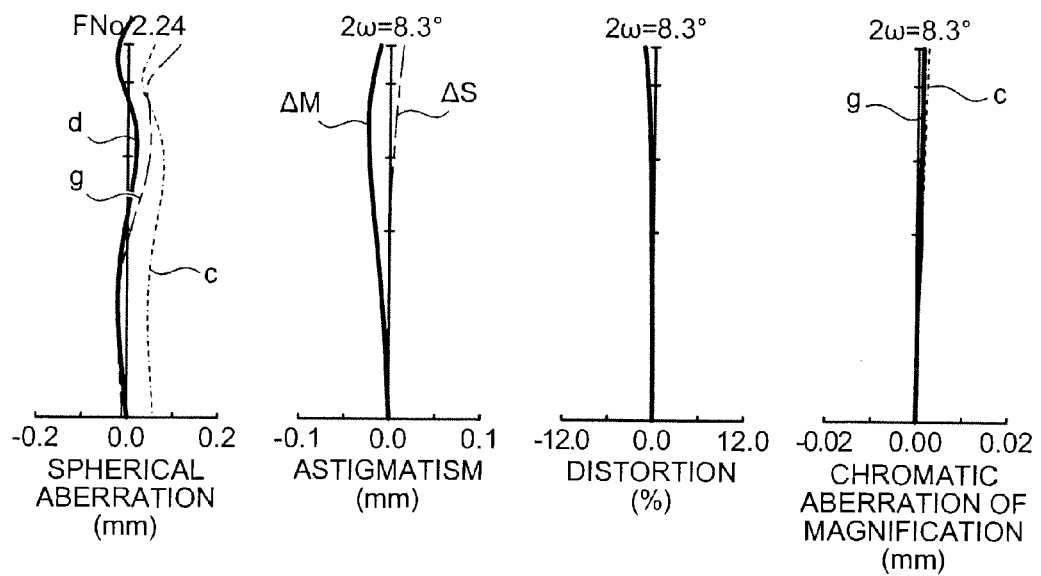
FIG. 11 is a diagram of various types of aberration at the intermediate edge of the zoom lens of the third embodiment according to the invention.
Figure 12:
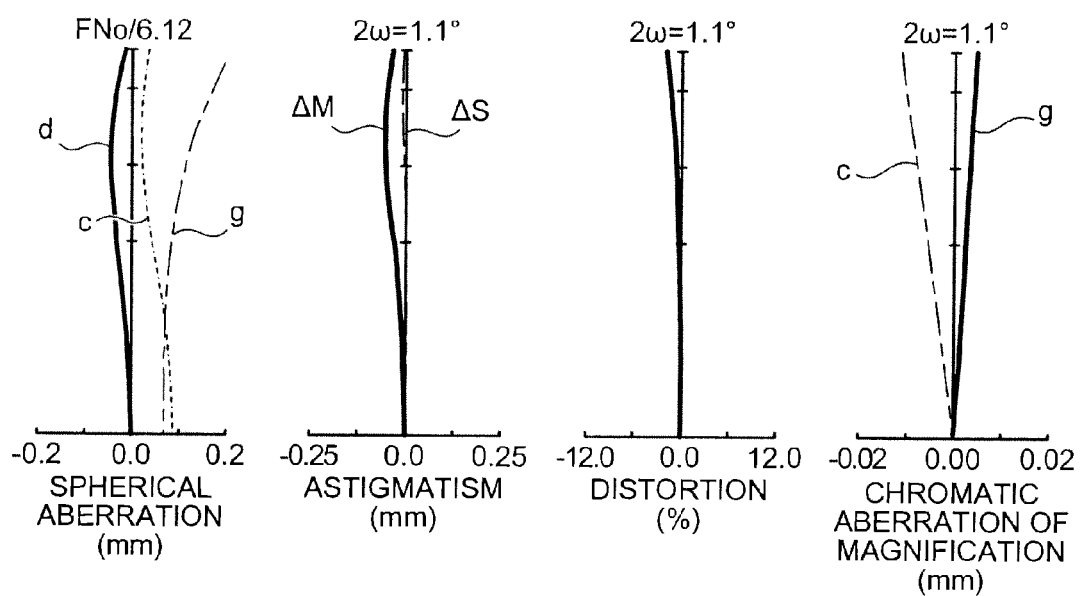
FIG. 12 is a diagram of various types of aberration at the telephoto edge of the zoom lens of the third embodiment according to the invention.

FIG. 10 is a diagram of various types of aberration at the wide angle edge of the zoom lens of the third embodiment according to the invention; FIG. 11 is a diagram of various types of aberration at the intermediate edge of the zoom lens of the third embodiment according to the invention; and FIG. 12 is a diagram of various types of aberration at the telephoto edge of the zoom lens of the third embodiment according to the invention. In the diagrams, FNo indicates the F number and $2\omega$ indicates the angle of view. Furthermore, g, d, and c represent wavelength aberration corresponding to the g-line ($\lambda=435.83$ nm), the d-line ($\lambda=587.56$ nm), and the c-line ($\lambda=656.27$ nm), respectively; and $\Delta S$ and $\Delta M$ in a portion depicting astigmatism, indicate aberration with respect to a sagittal image plane and a meridional image plane, respectively.

As described, according to the zoom lens of the third embodiment, by satisfying the conditional expression above, favorable aberration correction throughout the entire zoom range as well as compactness, high power zoom (on the order of 55×), and wide angle view (approximately 60°) can be achieved. In addition, optical image blur correction can be effectively performed as an anti-blur measure. Moreover, the zoom lens of the third embodiment has a configuration that includes a lens having an aspheric surface, whereby various types of aberration can be favorably corrected with few lenses.

Fourth Embodiment

Figure 13:
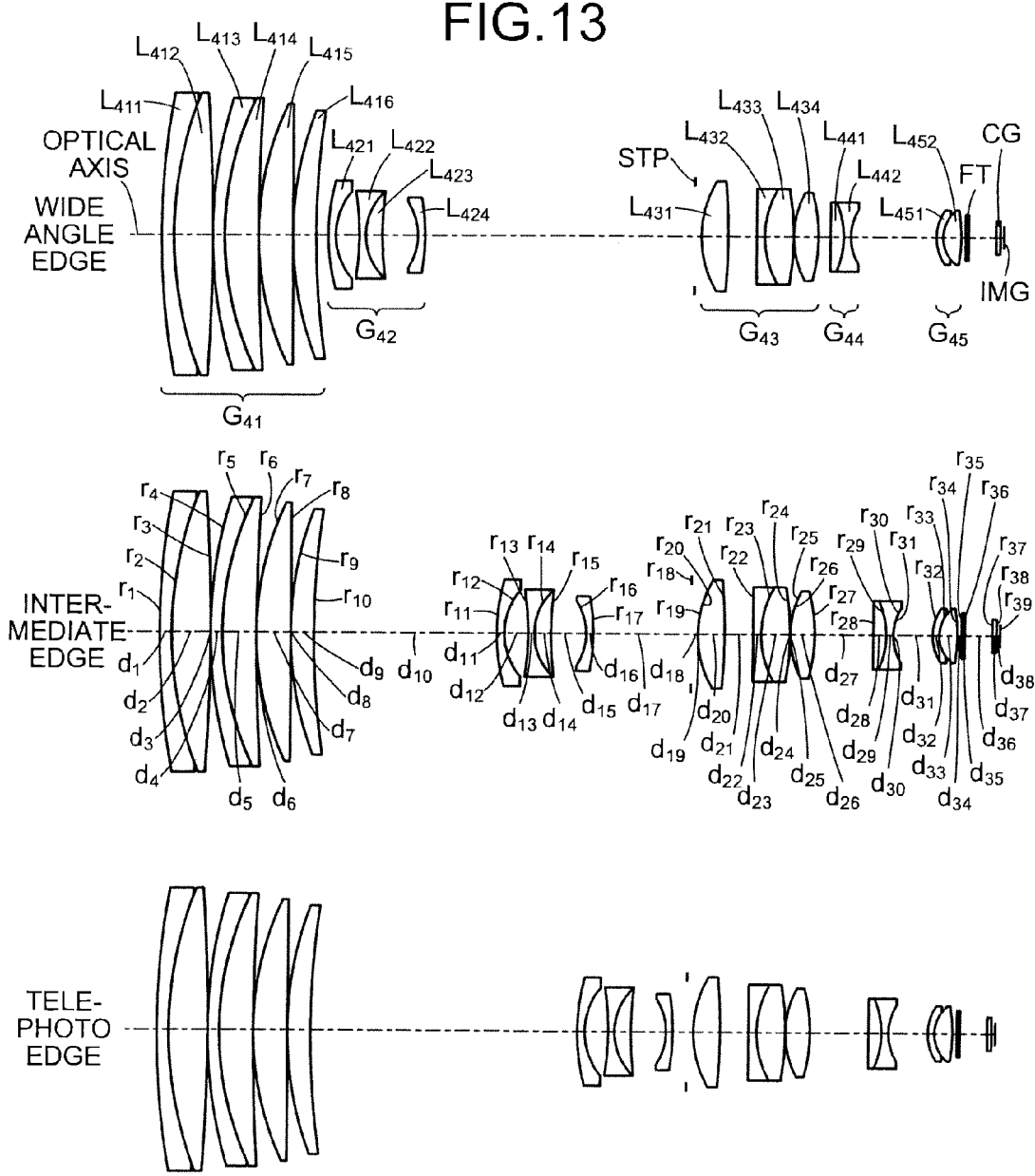
FIG. 13 depicts a cross-sectional view (along the optical axis) of the zoom lens of a fourth embodiment according to the present invention.

FIG. 13 depicts a cross-sectional view (along the optical axis) of the zoom lens of a fourth embodiment according to the present invention. The zoom lens includes sequentially from an object (not depicted) side, a first lens group $G_{41}$ having a positive refractive power, a second lens group $G_{42}$ having a negative refractive power, a third lens group $G_{43}$ having a positive refractive power, a fourth lens group $G_{44}$ having a negative refractive power, and a fifth lens group $G_{45}$ having a positive refractive power. Between the second lens group $G_{42}$ and the third lens group $G_{43}$, the diaphragm STP is disposed. Between the fifth lens group $G_{45}$ and the image plane IMG, the filter FT configured by an infrared cut filter, a low pass filter, etc. and the cover glass CG are disposed sequentially from the object side. The filter FT and the cover glass CG are disposed as necessary and when not necessary, may be omitted. Further, at the image plane IMG, the light receiving surface of an imaging element, such as a CCD and CMOS, is disposed.

The first lens group $G_{41}$ includes, sequentially from the object side, a negative lens $L_{411}$, a positive lens $L_{412}$, a negative lens $L_{413}$, a positive lens $L_{414}$, a positive lens $L_{415}$, and a positive lens $L_{416}$. The negative lens $L_{411}$ and the positive lens $L_{412}$ are cemented. Further, the negative lens $L_{413}$ and the positive lens $L_{414}$ are cemented.

The second lens group $G_{42}$ includes, sequentially from the object side, a negative lens $L_{421}$, a negative lens $L_{422}$, a positive lens $L_{423}$, and a negative lens $L_{424}$. The negative lens $L_{422}$ and the positive lens $L_{423}$ are cemented.

The third lens group $G_{43}$ includes, sequentially from the object side, a positive lens $L_{431}$, a negative lens $L_{432}$, a positive lens $L_{433}$, and a positive lens $L_{434}$. The negative lens $L_{432}$ and the positive lens $L_{433}$ are cemented. Further, the object-side surface of the positive lens $L_{431}$ and that of the positive lens $L_{434}$ are formed to be aspheric, respectively.

The fourth lens group $G_{44}$ includes, sequentially from the object side, a positive lens $L_{441}$ and a negative lens $L_{442}$. The positive lens $L_{441}$ and the negative lens $L_{442}$ are cemented. Further, the image plane IMG-side surface of the negative lens $L_{442}$ is formed to be aspheric.

The fifth lens group $G_{45}$ includes, sequentially from the object side, a negative lens $L_{451}$ and a positive lens $L_{452}$. The negative lens $L_{451}$ and the positive lens $L_{452}$ are cemented.

The zoom lens zooms from the wide angle edge to the telephoto edge by moving the second lens group $G_{42}$ along the optical axis, from the object side toward the image plane IMG side. Further, the zoom lens performs focusing and corrects image plane variation (image location) accompanying zoom, by moving the fourth lens group $G_{44}$ along the optical axis. The zoom lens corrects image blur caused by minute vibrations by moving the entire fifth lens group $G_{45}$ in a direction orthogonal to the optical axis. Furthermore, the first lens group $G_{41}$ and the third lens group $G_{43}$ do not move.

Various values related to the zoom lens according to the fourth embodiment are indicated below.

Focal length of entire zoom lens system, at wide angle edge
($f_w$) = 6.000 mm
Focal length of entire zoom lens system, at intermediate
edge = 44.501 mm
Focal length of entire zoom lens system, at telephoto edge
($f_t$) = 330.002 mm
F number = 1.83 (wide angle edge) to 2.22 (intermediate edge)
to 5.63 (telephoto edge)
Angle of view (2ω) = 56.9° (wide angle edge) to 8.1°
(intermediate edge) to 1.1° (telephoto edge)
(Values related to conditional expression (1))

Abbe number at d-line of negative lens $L_{413}$ ($\nu_{ln}$) = 55.53
Abbe number at d-line of positive lens $L_{414}$ ($\nu_{lp}$) = 94.94
$\nu_{lp} - \nu_{ln}$ = 39.41
(Values related to conditional expression (2))

Focal length of first lens group $G_{41}$ ($f_1$) = 100.81
$f_1/f_t$ = 0.305
(Values related to conditional expression (3))

Focal length of third lens group $G_{43}$ ($f_3$) = 23.40
$f_3/f_w$ = 3.900
(Values related to conditional expression (4))

Focal length of fourth lens group $G_{44}$ ($f_4$) = −18.03
Focal length of fifth lens group $G_{45}$ ($f_5$) = 21.18
$|f_4/f_5|$ = 0.852
(Values related to conditional expression (5))

$f_5/f_t$ = 0.064
(Values related to conditional expression (6))

Radius of curvature on image plane IMG side of positive
lens $L_{452}$ ($R_p$) = −69.981
$|FN_w \times R_p/f_w|$ = 21.3

| | | | |
|---|---|---|---|
| $r_1$ = 212.484 | $d_1$ = 2.500 | $nd_1$ = 1.83481 | $\nu d_1$ = 42.71 |
| $r_2$ = 90.896 | $d_2$ = 8.453 | $nd_2$ = 1.43875 | $\nu d_2$ = 94.94 |
| $r_3$ = −752.996 | $d_3$ = 0.200 | | |
| $r_4$ = 118.298 | $d_4$ = 2.500 | $nd_3$ = 1.69680 | $\nu d_3$ = 55.53 |
| $r_5$ = 74.775 | $d_5$ = 7.189 | $nd_4$ = 1.43875 | $\nu d_4$ = 94.94 |
| $r_6$ = 326.133 | $d_6$ = 0.200 | | |
| $r_7$ = 73.572 | $d_7$ = 7.114 | $nd_5$ = 1.43875 | $\nu d_5$ = 94.94 |
| $r_8$ = 921.593 | $d_8$ = 0.200 | | |
| $r_9$ = 81.989 | $d_9$ = 5.000 | $nd_6$ = 1.43875 | $\nu d_6$ = 94.94 |
| $r_{10}$ = 219.716 | $d_{10}$ = 2.788 (wide angle edge) to 54.806 (intermediate edge) to 73.242 (telephoto edge) | | |
| $r_{11}$ = 53.278 | $d_{11}$ = 1.500 | $nd_7$ = 1.88300 | $\nu d_7$ = 40.76 |
| $r_{12}$ = 15.931 | $d_{12}$ = 5.373 | | |
| $r_{13}$ = −52.131 | $d_{13}$ = 1.200 | $nd_8$ = 1.77250 | $\nu d_8$ = 49.60 |
| $r_{14}$ = 14.761 | $d_{14}$ = 3.800 | $nd_9$ = 1.92286 | $\nu d_9$ = 20.88 |
| $r_{15}$ = 95.425 | $d_{15}$ = 7.636 | | |
| $r_{16}$ = −16.679 | $d_{16}$ = 1.200 | $nd_{10}$ = 1.61800 | $\nu d_{10}$ = 63.39 |
| $r_{17}$ = −65.902 | $d_{17}$ = 73.262 (wide angle edge) to 21.244 (intermediate edge) to 2.808 (telephoto edge) | | |
| $r_{18}$ = ∞ (diaphragm) | $d_{18}$ = 1.300 | | |
| $r_{19}$ = 25.548 (aspheric surface) | $d_{19}$ = 0.200 | $nd_{11}$ = 1.53610 | $\nu d_{11}$ = 41.21 |
| $r_{20}$ = 26.862 | $d_{20}$ = 6.000 | $nd_{12}$ = 1.61800 | $\nu d_{12}$ = 63.39 |
| $r_{21}$ = −184.045 | $d_{21}$ = 6.351 | | |
| $r_{22}$ = −1561.817 | $d_{22}$ = 1.500 | $nd_{13}$ = 1.75520 | $\nu d_{13}$ = 27.53 |
| $r_{23}$ = 25.622 | $d_{23}$ = 6.000 | $nd_{14}$ = 1.49700 | $\nu d_{14}$ = 81.54 |
| $r_{24}$ = −99.883 | $d_{24}$ = 0.200 | | |
| $r_{25}$ = 24.671 (aspheric surface) | $d_{25}$ = 0.200 | $nd_{15}$ = 1.51460 | $\nu d_{15}$ = 49.96 |
| $r_{26}$ = 24.207 | $d_{26}$ = 5.000 | $nd_{16}$ = 1.59282 | $\nu d_{16}$ = 68.62 |

-continued

| | | | |
|---|---|---|---|
| $r_{27} = -61.713$ | $d_{27} = 2.850$ (wide angle edge) to 13.393 (intermediate edge) to 2.850 (telephoto edge) | | |
| $r_{28} = 158.304$ | $d_{28} = 3.000$ | $nd_{17} = 1.84666$ | $\nu d_{17} = 23.78$ |
| $r_{29} = -27.940$ | $d_{29} = 1.200$ | $nd_{18} = 1.80400$ | $\nu d_{18} = 46.57$ |
| $r_{30} = 12.873$ | $d_{30} = 0.200$ | $nd_{19} = 1.53610$ | $\nu d_{19} = 41.21$ |
| $r_{31} = 12.684$ (aspheric surface) | $d_{31} = 18.798$ (wide angle edge) to 8.255 (intermediate edge) to 18.798 (telephoto edge) | | |
| $r_{32} = 14.308$ | $d_{32} = 1.200$ | $nd_{20} = 1.84666$ | $\nu d_{20} = 23.78$ |
| $r_{33} = 9.000$ | $d_{33} = 4.000$ | $nd_{21} = 1.65844$ | $\nu d_{21} = 50.85$ |
| $r_{34} = -69.981$ | $d_{34} = 1.000$ | | |
| $r_{35} = \infty$ | $d_{35} = 0.500$ | $nd_{22} = 1.51633$ | $\nu d_{22} = 64.14$ |
| $r_{36} = \infty$ | $d_{36} = 6.200$ | | |
| $r_{37} = \infty$ | $d_{37} = 1.000$ | $nd_{23} = 1.51633$ | $\nu d_{23} = 64.14$ |
| $r_{38} = \infty$ | $d_{38} = 0.996$ | | |
| $r_{39} = \infty$ (image plane) | | | |

Constant of cone ($\epsilon$) and Aspheric coefficients (A, B, C, D, E)

(Nineteenth plane)

$\epsilon = 1.0000$,
$A = 0$,
$B = -7.25047 \times 10^{-6}$, $C = -1.97750 \times 10^{-8}$,
$D = 2.89146 \times 10^{-11}$, $E = -7.12361 \times 10^{-14}$ (Twenty-fifth plane)

$\epsilon = 1.0000$,
$A = 0$,
$B = -2.57195 \times 10^{-5}$, $C = -1.35530 \times 10^{-8}$,
$D = 8.41473 \times 10^{-11}$, $E = -5.17187 \times 10^{-13}$ (Thirty-first plane)

$\epsilon = 1.0000$,
$A = 0$,
$B = -1.00118 \times 10^{-5}$, $C = -7.41829 \times 10^{-7}$,
$D = 2.41019 \times 10^{-8}$, $E = -3.16008 \times 10^{-10}$ Among the values for each of the examples above, $r_1$, $r_2$, . . . indicate radii of curvature for each lens, diaphragm surface, etc.; $d_1$, $d_2$, . . . indicate the thickness of the lenses, diaphragm, etc. or the distance between surfaces thereof; $nd_1$, $nd_2$, . . . indicate the refraction index of each lens with respect to the d-line ($\lambda$=587.56 nm); and $\nu d_1$, $\nu d_2$, . . . indicate the Abbe number with respect to the d-line ($\lambda$=587.56 nm) of each lens.

Each of the aspheric surfaces above can be expressed by equation [1], where X is the direction of the optical axis, H is the height from the optical axis, and the travel direction of light is positive.

Where, R is the paraxial radius of curvature; $\epsilon$ is the constant of the cone; and A, B, C, D, E are the second, fourth, sixth, eighth, and tenth aspheric coefficients, respectively.

Figure 14:
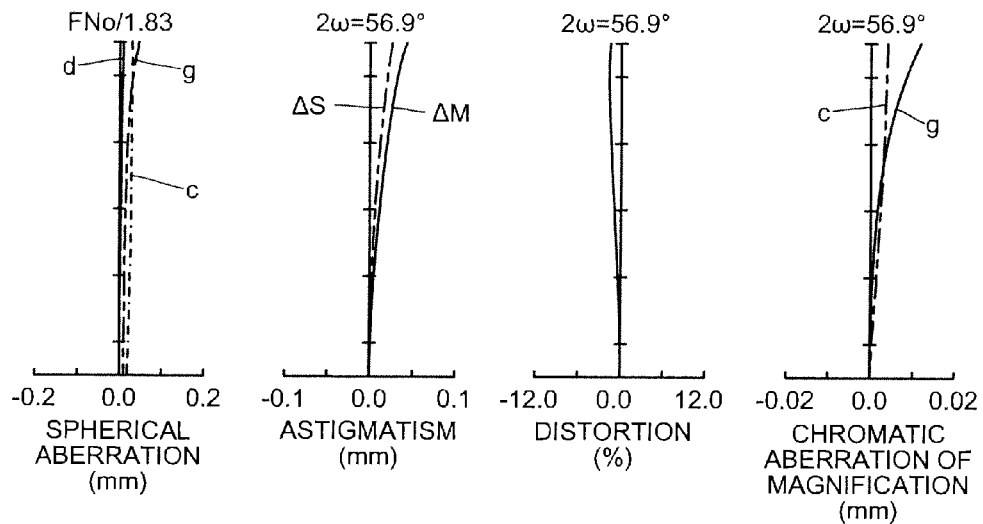
FIG. 14 is a diagram of various types of aberration at the wide angle edge of the zoom lens of the fourth embodiment according to the invention.
Figure 15:
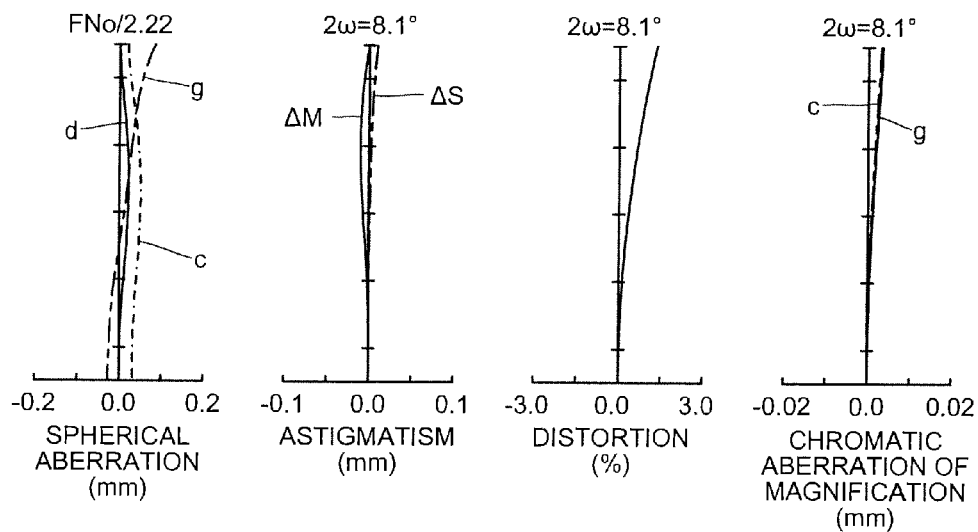
FIG. 15 is a diagram of various types of aberration at the intermediate edge of the zoom lens of the fourth embodiment according to the invention.
Figure 16:
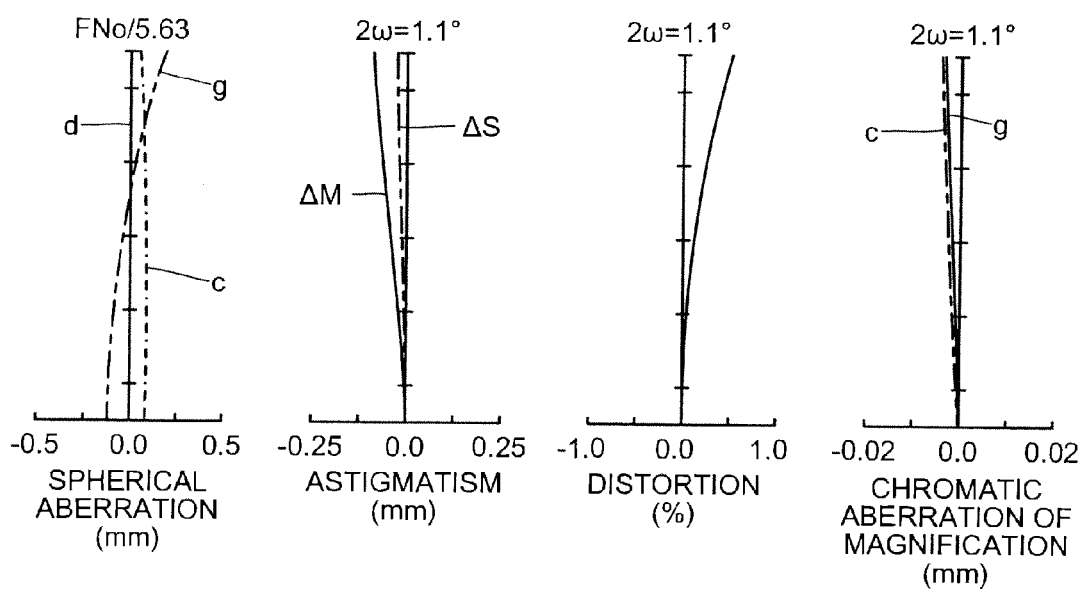
FIG. 16 is a diagram of various types of aberration at the telephoto edge of the zoom lens of the fourth embodiment according to the invention.

FIG. 14 is a diagram of various types of aberration at the wide angle edge of the zoom lens of the fourth embodiment according to the invention; FIG. 15 is a diagram of various types of aberration at the intermediate edge of the zoom lens of the fourth embodiment according to the invention; and FIG. 16 is a diagram of various types of aberration at the telephoto edge of the zoom lens of the fourth embodiment according to the invention. In the diagrams, FNo indicates the F number and 2ω indicates the angle of view. Furthermore, g, d, and c represent wavelength aberration corresponding to the g-line ($\lambda$=435.83 nm), the d-line ($\lambda$=587.56 nm), and the c-line ($\lambda$=656.27 nm), respectively; and ΔS and ΔM in a portion depicting astigmatism, indicate aberration with respect to a sagittal image plane and a meridional image plane, respectively.

As described, according to the zoom lens of the fourth embodiment, by satisfying the conditional expression above, favorable aberration correction throughout the entire zoom range as well as compactness, high power zoom (on the order of 55×), and wide angle view (approximately 60°) can be achieved. In addition, optical image blur correction can be effectively performed as an anti-blur measure. Moreover, the zoom lens of the fourth embodiment has a configuration that includes a lens having an aspheric surface, whereby various types of aberration can be favorably corrected with few lenses.

INDUSTRIAL APPLICABILITY

As described, the zoom lens of the present invention is useful in monitoring cameras demanding compactness, high power magnification and wide angle view; and is particularly ideal when optical image blur correction, as an anti-blue measure, is demanded.

EXPLANATIONS OF LETTERS OR NUMERALS $G_{11}$ First lens group
$G_{12}$ Second lens group
$G_{13}$ Third lens group
$G_{14}$ Fourth lens group
$G_{15}$ Fifth lens group
IMG Image plan
STP Diaphragm
FT Filter
CG Cover glass

The invention claimed is:

1. A zoom lens comprising sequentially from an object side:
   a first lens group having a positive refractive power;
   a second lens group having a negative refractive power;
   a third lens group having a positive refractive power;
   a fourth lens group having a negative refractive power; and
   a fifth lens group having a positive refractive power and formed by a cemented lens alone, the cemented lens comprising a negative lens and a positive lens, wherein
   the zoom lens zooms from a wide angle edge to a telephoto edge by moving the second lens group along an optical axis, from the object side toward an image plane side,
   the zoom lens performs focusing and corrects image plane variation accompanying zoom by moving the fourth lens group along the optical axis,
   the zoom lens corrects image blur caused by minute vibrations by moving the entire fifth lens group in a direction orthogonal to the optical axis, and
   a conditional expression $0.06<f_5/f_t<0.08$ is satisfied, where $f_5$ is the focal length of the fifth lens group and $f_t$ is the focal length of the entire zoom lens system, at the telephoto edge.

2. The zoom lens according to claim 1, wherein the fifth lens group is fixed with respect to a direction along the optical axis during zoom and focusing.

3. The zoom lens according to claim 1, wherein the third lens group includes, sequentially from the object side, a positive lens, and a cemented lens formed by a negative lens and a positive lens.

4. The zoom lens according to claim 3, wherein
   the third lens group includes on the image plane side of the cemented lens, at least one positive lens.

5. The zoom lens according to claim 1, wherein conditional expressions:

$$|FN_w \times R_p/f_w|>20,$$

$$FN_w \leq 1.83,$$

$$0.7<|f_4/f_5|<1.0$$

are satisfied where $R_p$ is the radius of curvature of the image plane side of the positive lens constituting the fifth lens group, $f_w$ is the focal length of the entire zoom lens system, at the wide angle edge, $FN_w$ is the F number of the entire zoom lens, at the wide angle edge, $f_4$ is the focal length of the fourth lens group, and $f_5$ is the focal length of the fifth lens group.

6. A zoom lens comprising sequentially from an object side:
   a first lens group having a positive refractive power;
   a second lens group having a negative refractive power;
   a third lens group having a positive refractive power;
   a fourth lens group having a negative refractive power; and
   a fifth lens group having a positive refractive power and formed by a cemented lens alone, the cemented lens comprising a negative lens and a positive lens, wherein
   the zoom lens zooms from a wide angle edge to a telephoto edge by moving the second lens group along an optical axis, from the object side toward an image plane side,
   the zoom lens performs focusing and corrects image plane variation accompanying zoom by moving the fourth lens group along the optical axis,
   the zoom lens corrects image blur caused by minute vibrations by moving the entire fifth lens group in a direction orthogonal to the optical axis, and
   the third lens group includes, sequentially from the object side, a positive lens, and a cemented lens formed by a negative lens and a positive lens.

7. The zoom lens according to claim 6, wherein
   the third lens group includes on the image plane side of the cemented lens, at least one positive lens.

8. A zoom lens comprising sequentially from an object side:
   a first lens group having a positive refractive power;
   a second lens group having a negative refractive power;
   a third lens group having a positive refractive power;
   a fourth lens group having a negative refractive power; and
   a fifth lens group having a positive refractive power and formed by a cemented lens alone, the cemented lens comprising a negative lens and a positive lens, wherein
   the zoom lens zooms from a wide angle edge to a telephoto edge by moving the second lens group along an optical axis, from the object side toward an image plane side,
   the zoom lens performs focusing and corrects image plane variation accompanying zoom by moving the fourth lens group along the optical axis,
   the zoom lens corrects image blur caused by minute vibrations by moving the entire fifth lens group in a direction orthogonal to the optical axis, and
   conditional expressions:

$$|FN_w \times R_p/f_w|>20,$$

$$FN_w \leq 1.83,$$

$$0.7<|f_4/f_5|<1.0$$

are satisfied where $R_p$ is the radius of curvature of the image plane side of the positive lens constituting the fifth lens group, $f_w$ is the focal length of the entire zoom lens system, at the wide angle edge, $FN_w$ is the F number of the entire zoom lens, at the wide angle edge, $f_4$ is the focal length of the fourth lens group, and $f_5$ is the focal length of the fifth lens group.

* * * * *